United States Patent
Deshpande

(10) Patent No.: US 11,973,970 B2
(45) Date of Patent: *Apr. 30, 2024

(54) SYSTEMS AND METHODS FOR SIGNALING PARAMETERS IN VIDEO CODING

(71) Applicants: SHARP KABUSHIKI KAISHA, Sakai (JP); FG Innovation Company Limited, Tuen Mun (HK)

(72) Inventor: Sachin G. Deshpande, Vancouver, WA (US)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,023

(22) Filed: Feb. 17, 2023

(65) Prior Publication Data

US 2023/0209079 A1    Jun. 29, 2023

Related U.S. Application Data

(63) Continuation of application No. 17/277,062, filed as application No. PCT/JP2019/036316 on Sep. 17, 2019, now Pat. No. 11,589,069.

Related U.S. Application Data

(60) Provisional application No. 62/734,232, filed on Sep. 20, 2018.

(51) Int. Cl.
*H04N 19/51* (2014.01)
*H04N 19/119* (2014.01)
*H04N 19/172* (2014.01)

(52) U.S. Cl.
CPC ........... *H04N 19/51* (2014.11); *H04N 19/119* (2014.11); *H04N 19/172* (2014.11)

(58) Field of Classification Search
CPC .............................. H04N 19/51; H04N 19/119
See application file for complete search history.

(56) References Cited

U.S. PATENT DOCUMENTS

| | | | |
|---|---|---|---|
| 2015/0078456 A1 | 3/2015 | Hannuksela | |
| 2015/0271507 A1 | 9/2015 | Hendry et al. | |
| 2021/0185310 A1* | 6/2021 | Chen | H04N 19/105 |

FOREIGN PATENT DOCUMENTS

| | | |
|---|---|---|
| CN | 105308965 A | 2/2016 |
| CN | 105519118 A | 4/2016 |

OTHER PUBLICATIONS

Series H: Audiovisual and Multimedia Systems Infrastructure of audio visual services—Coding of moving video, Recommendation ITU-T H. 265(04/13) High efficiency video coding, ITU-T, Jun. 7, 2013, pp. 30, 54-57.

* cited by examiner

*Primary Examiner* — Jerry T Jean Baptiste
(74) *Attorney, Agent, or Firm* — ScienBiziP, P.C.

(57) ABSTRACT

A method of encoding video data by an electronic device is provided. A plurality of picture parameters included in a picture header of a picture in the video data is signaled into a bitstream. A present flag included in a sub-picture header of a sub-picture generated by dividing the picture is signaled into the bitstream. The electronic device determines, based on the present flag, whether a specific one of a plurality of sub-picture parameters is determined based on the sub-picture header or the picture header. The specific one of the plurality of sub-picture parameters corresponds to the specific one of the plurality of picture parameters. The sub-picture is reconstructed based on the specific one of the plurality of sub-picture parameters when the specific one of the plurality of sub-picture parameters is determined from the sub-picture header.

18 Claims, 7 Drawing Sheets

SYSTEMS AND METHODS FOR SIGNALING PARAMETERS IN VIDEO CODING

CROSS-REFERENCE TO RELATED APPLICATION(S)

This application is a continuation application of U.S. patent application Ser. No. 17/277,062, filed on Mar. 17, 2021 ("the '062 application"), which is a National Stage application of International Application Serial No. PCT/JP2019/036316, filed on Sep. 17, 2019, which claims the benefit of and priority to a provisional U.S. Patent Application Ser. No. 62/734,232, filed on Sep. 20, 2018 ("the '232 provisional"). The contents of the '062 application and the '232 provisional are fully incorporated herein by reference in their entireties.

TECHNICAL FIELD

This disclosure relates to video coding and more particularly to techniques for signaling of tile set parameters for coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding were proposed by various groups at the 10th Meeting of ISO/IEC JTC1/SC29/WG11 16-20 Apr. 2018, San Diego, Calif. As a result of the multiple descriptions of video coding, a draft text of a video coding specification is described in "Versatile Video Coding (Draft 1)," 10th Meeting of ISO/IEC JTC1/SC29/WG11 16-20 Apr. 2018, San Diego, Calif., document JVET-J1001-v2, which is incorporated by reference herein, and referred to as JVET-J1001. "Versatile Video Coding (Draft 2)," 11th Meeting of ISO/IEC JTC1/SC29/WG11 10-18 Jul. 2018, Ljubljana, SI, document JVET-K1001-v5, which is incorporated by reference herein, and referred to as JVET-K1001, is an update to JVET-J1001.

Video compression techniques reduce data requirements for storing and transmitting video data by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream. Compliant bitstreams and associated metadata may be formatted according to data structures.

SUMMARY OF INVENTION

In a first aspect of the present disclosure, a method of decoding video data is provided. The method includes parsing a plurality of picture parameters included in a picture header of a picture in the video data; parsing a present flag included in a sub-picture header of a sub-picture generated by dividing the picture; determining, based on the present flag, whether a specific one of a plurality of sub-picture parameters is determined based on the sub-picture header or the picture header, the specific one of the plurality of sub-picture parameters corresponding to the specific one of the plurality of picture parameters; and reconstructing the sub-picture based on the specific one of the plurality of sub-picture parameters when the specific one of the plurality of sub-picture parameters is determined based on the sub-picture header.

In a second aspect of the present disclosure, an electronic device for decoding a bitstream is provided. The electronic device includes at least one processor; and a storage device coupled to the at least one processor. The storage device stores a program which, when executed by the at least one processor, causes the at least one processor to: parse a plurality of picture parameters included in a picture header of a picture in the video data; parse a present flag included in a sub-picture header of a sub-picture generated by dividing the picture; determine, based on the present flag, whether a specific one of a plurality of sub-picture parameters is determined based on the sub-picture header or the picture header, the specific one of the plurality of sub-picture parameters corresponding to the specific one of the plurality of picture parameters; and reconstruct the sub-picture based on the specific one of the plurality of sub-picture parameters when the specific one of the plurality of sub-picture parameters is determined based on the sub-picture header.

In a third aspect of the present disclosure, a method of encoding video data is provided. The method includes signaling, into a bitstream, a plurality of picture parameters included in a picture header of a picture in the video data; signaling, into a bitstream, a present flag included in a sub-picture header of a sub-picture generated by dividing the picture; determining, based on the present flag, whether a specific one of a plurality of sub-picture parameters is determined based on the sub-picture header or the picture header, the specific one of the plurality of sub-picture parameters corresponding to the specific one of the plurality of picture parameters; and reconstructing the sub-picture based on the specific one of the plurality of sub-picture parameters when the specific one of the plurality of sub-picture parameters is determined based on the sub-picture header.

In a fourth aspect of the present disclosure, a machine-readable medium for encoding video data is provided. The machine-readable medium stores a plurality of computer-executable instructions which, when executed by an electronic device, causes the electronic device to: signal, into a bitstream, a plurality of picture parameters included in a picture header of a picture in the video data; signal, into the bitstream, a present flag included in a sub-picture header of a sub-picture generated by dividing the picture; determine, based on the present flag, whether a specific one of a plurality of sub-picture parameters is determined based on the sub-picture header or the picture header, the specific one of the plurality of sub-picture parameters corresponding to the specific one of the plurality of picture parameters; and reconstruct the sub-picture based on the specific one of the plurality of sub-picture parameters when the specific one of the plurality of sub-picture parameters is determined based on the sub-picture header.

DESCRIPTION OF EMBODIMENTS

Figure 1:
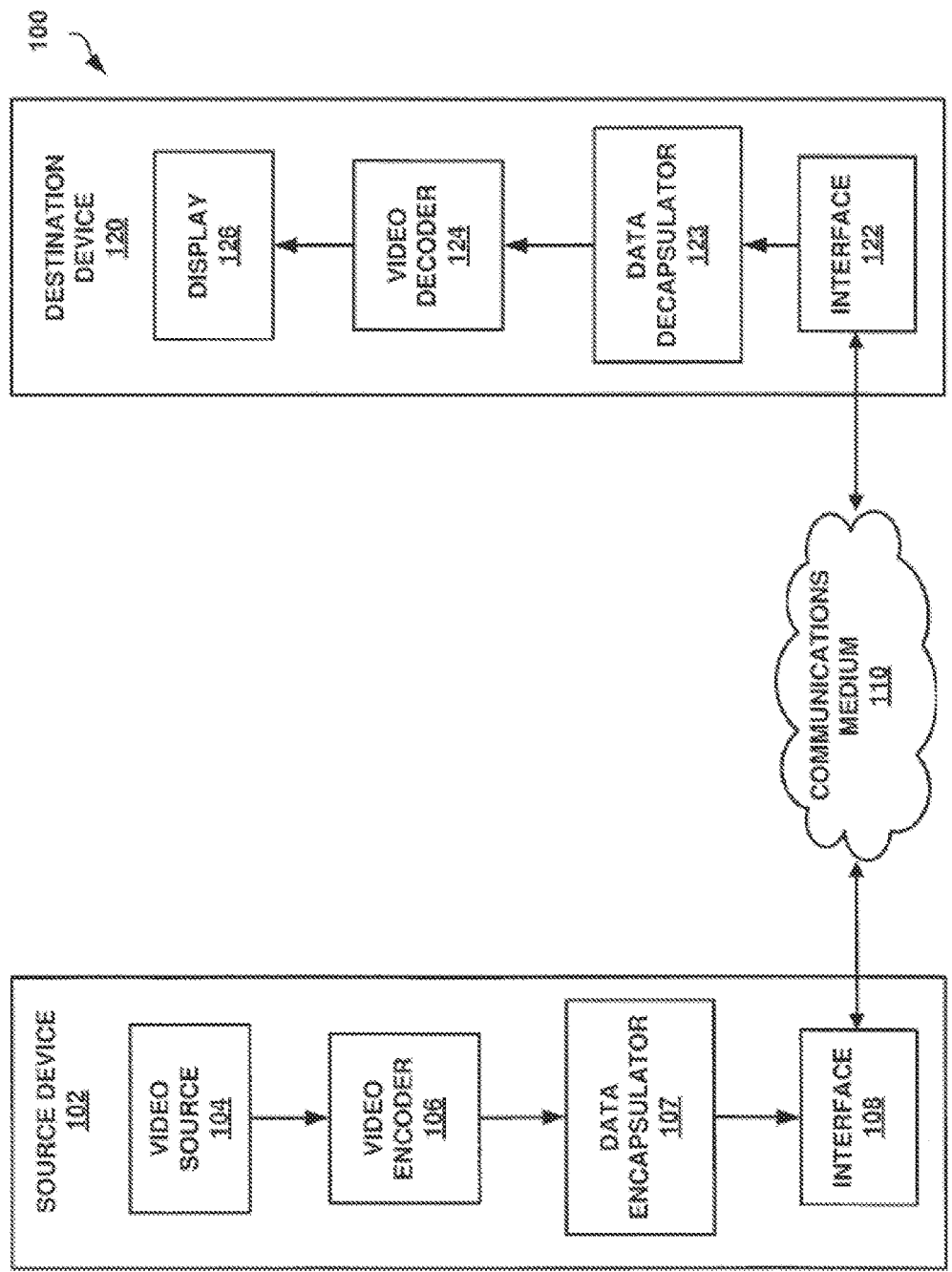
FIG. 1 is a block diagram illustrating an example of a system that may be configured to encode and decode video data according to one or more techniques of this disclosure.

In general, this disclosure describes various techniques for coding video data. In particular, this disclosure describes techniques for signaling tile set parameters for coded video. Signaling of tile set parameters according to the techniques described herein may be particularly useful for improving video distribution system performance by lowering transmission bandwidth and/or facilitating parallelization of a video encoder and/or decoder. It should be noted that although techniques of this disclosure are described with respect to ITU-T H.264, ITU-T H.265, JVET-J1001, and JVET-K1001 the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265. Thus, reference to ITU-T H.264, ITU-T H.265, JVET-J1001, and JVET-K1001, is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device comprises one or more processors configured to signal a value for a syntax element in a network abstraction layer unit indicating a tile set layer syntax structure is included in the network abstraction layer unit and signal values for one or more tile set parameters included in the tile set layer syntax structure.

In one example, a non-transitory computer-readable storage medium comprises instructions stored thereon that, when executed, cause one or more processors of a device to signal a value for a syntax element in a network abstraction layer unit indicating a tile set layer syntax structure is included in the network abstraction layer unit and signal values for one or more tile set parameters included in the tile set layer syntax structure.

In one example, an apparatus comprises means for signaling a value for a syntax element in a network abstraction layer unit indicating a tile set layer syntax structure is included in the network abstraction layer unit and means for signaling values for one or more tile set parameters included in the tile set layer syntax structure.

In one example, a device comprises one or more processors configured to parse a value for a syntax element in a network abstraction layer unit indicating a tile set layer syntax structure is included in the network abstraction layer unit, parse values for one or more tile set parameters included in the tile set layer syntax structure, and generate video data based on the parsed values for one or more tile set parameters.

In one example, a non-transitory computer-readable storage medium comprises instructions stored thereon that, when executed, cause one or more processors of a device to parse a value for a syntax element in a network abstraction layer unit indicating a tile set layer syntax structure is included in the network abstraction layer unit, parse values for one or more tile set parameters included in the tile set layer syntax structure, and generate video data based on the parsed values for one or more tile set parameters.

In one example, an apparatus comprises means for parsing a value for a syntax element in a network abstraction layer unit indicating a tile set layer syntax structure is included in the network abstraction layer unit, means for parsing values for one or more tile set parameters included in the tile set layer syntax structure, and means for generating video data based on the parsed values for one or more tile set parameters.

The details of one or more examples are set forth in the accompanying drawings and the description below. Other features, objects, and advantages will be apparent from the description and drawings, and from the claims.

Video content typically includes video sequences comprised of a series of frames. A series of frames may also be referred to as a group of pictures (GOP). Each video frame or picture may include a one or more slices, where a slice includes a plurality of video blocks. A video block includes an array of pixel values (also referred to as samples) that may be predictively coded. Video blocks may be ordered according to a scan pattern (e.g., a raster scan). A video encoder performs predictive encoding on video blocks and sub-divisions thereof. ITU-T H.264 specifies a macroblock including 16×16 luma samples. ITU-T H.265 specifies an analogous Coding Tree Unit (CTU) structure (which may be referred to as a Largest Coding Unit (LCU)) where a picture may be split into CTUs of equal size and each CTU may include Coding Tree Blocks (CTB) having 16×16, 32×32, or 64×64 luma samples. As used herein, the term video block may generally refer to an area of a picture or may more specifically refer to the largest array of pixel values that may be predictively coded, sub-divisions thereof, and/or corresponding structures. Further, according to ITU-T H.265, each video frame or picture may be partitioned to include one or more tiles, where a tile is a sequence of coding tree units corresponding to a rectangular area of a picture.

In ITU-T H.265, a CTU is composed of respective CTBs for each component of video data (e.g., luma (Y) and chroma (Cb and Cr)). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB sizes type include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

Figure 2:
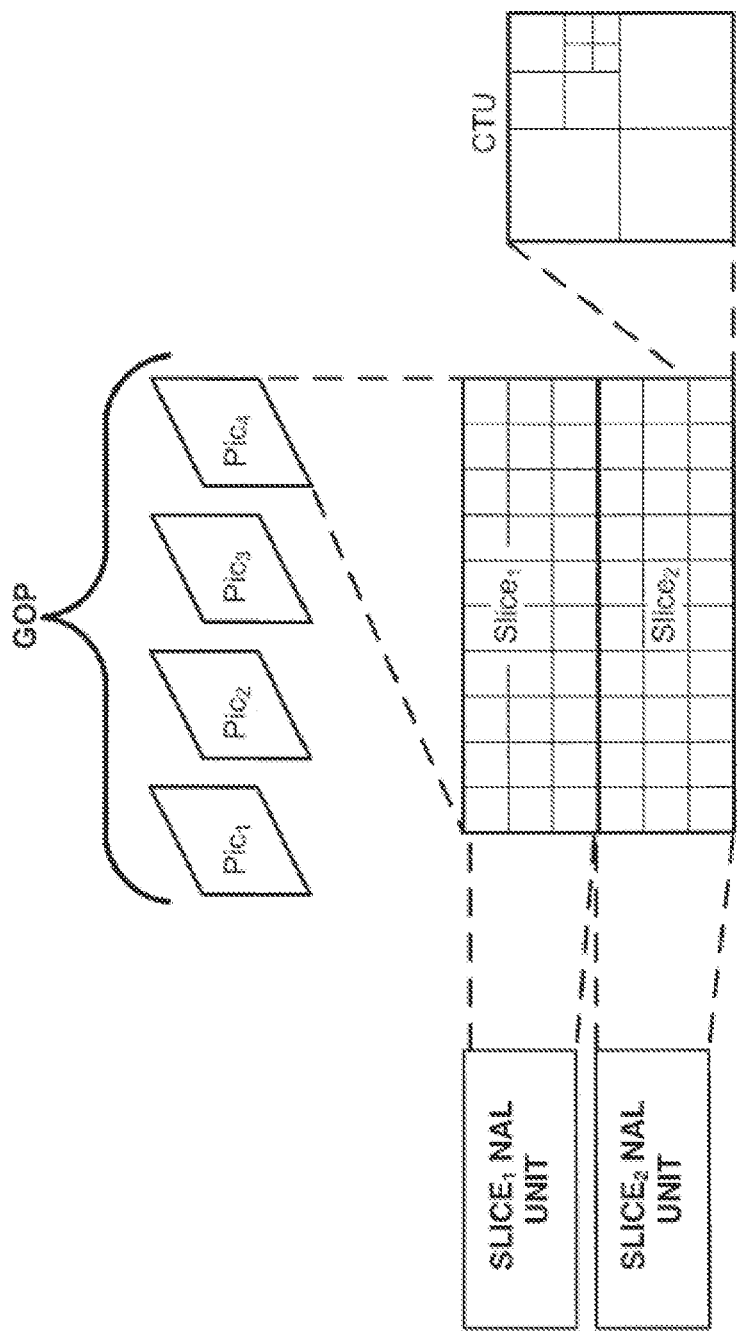
FIG. 2 is a conceptual diagram illustrating coded video data and corresponding data structures according to one or more techniques of this disclosure.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. Thus, the binary tree structure in JEM enables square and rectangular leaf nodes, where each leaf node includes a CB. As illustrated in FIG. 2, a picture included in a GOP may include slices, where each slice includes a sequence of CTUs and each CTU may be partitioned according to a QTBT structure. In JEM, CBs are used for prediction without any further partitioning. That is, in JEM, a CB may be a block of sample values on which the same prediction is applied. Thus, a JEM QTBT leaf node may be analogous a PB in ITU-T H.265.

Intra prediction data (e.g., intra prediction mode syntax elements) or inter prediction data (e.g., motion data syntax elements) may associate PUs with corresponding reference samples. Residual data may include respective arrays of difference values corresponding to each component of video data (e.g., luma (Y) and chroma (Cb and Cr)). Residual data may be in the pixel domain. A transform, such as, a discrete cosine transform (DCT), a discrete sine transform (DST), an integer transform, a wavelet transform, or a conceptually similar transform, may be applied to pixel difference values to generate transform coefficients. It should be noted that in ITU-T H.265, CUs may be further sub-divided into Transform Units (TUs). That is, an array of pixel difference values may be sub-divided for purposes of generating transform coefficients (e.g., four 8×8 transforms may be applied to a 16×16 array of residual values corresponding to a 16×16 luma CB), such sub-divisions may be referred to as Transform Blocks (TBs). Transform coefficients may be quantized according to a quantization parameter (QP). Quantized transform coefficients (which may be referred to as level values) may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins."

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. As described above, intra prediction data or inter prediction data may associate an area of a picture (e.g., a PB or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a motion vector (MV) identifies reference samples in a picture other than the picture of a video block to be coded and thereby exploits temporal redundancy in video. For example, a current video block may be predicted from reference block(s) located in previously coded frame(s) and a motion vector may be used to indicate the location of the reference block. A motion vector and associated data may describe, for example, a horizontal component of the motion vector, a vertical component of the motion vector, a resolution for the motion vector (e.g., one-quarter pixel precision, one-half pixel precision, one-pixel precision, two-pixel precision, four-pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP), Spatial-temporal motion vector prediction (STMVP), Pattern matched motion vector derivation (PMMVD) mode, which is a special merge mode based on Frame-Rate Up Conversion (FRUC) techniques, and affine transform motion compensation prediction.

Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. In ITU-T H.265, a CU is associated with a transform unit (TU) structure having its root at the CU level. That is, in ITU-T H.265, as described above, an array of difference values may be sub-divided for purposes of generating transform coefficients (e.g., four 8×8 transforms may be applied to a 16×16 array of residual values). It should be noted that in ITU-T H.265, TBs are not necessarily aligned with PBs.

It should be noted that in JEM, residual values corresponding to a CB are used to generate transform coefficients without further partitioning. That is, in JEM a QTBT leaf node may be analogous to both a PB and a TB in ITU-T H.265. It should be noted that in JEM, a core transform and a subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization approximates transform coefficients by amplitudes restricted to a set of specified values. Quantization may be used in order to vary the amount of data required to represent a group of transform coefficients. Quantization may be realized through division of transform coefficients by a scaling factor and any associated rounding functions (e.g., rounding to the nearest integer). Quantized transform coefficients may be referred to as coefficient level values. Inverse quantization (or "dequantization") may include multiplication of coefficient level values by the scaling factor. It should be noted that as used herein the term quantization process in some instances may refer to division by a scaling factor to generate level values or multiplication by a scaling factor to recover transform coefficients in some instances. That is, a quantization process may refer to quantization in some cases and inverse quantization in some cases.

With respect to the equations used herein, the following arithmetic operators may be used:

| | |
|---|---|
| + | Addition |
| − | Subtraction |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7/4 and −7/−4 are truncated to 1 and −7/4 and 7/−4 are truncated to −1. |
| ÷ | Used to denote division in mathematical equations where no truncation or rounding is intended. |
| $\frac{x}{y}$ | Used to denote division in mathematical equations where no truncation or rounding is intended. |

Further, the following mathematical functions may be used:
Log2(x) the base-2 logarithm of x;

$$\text{Min}(x, y) = \begin{cases} x; x <= y \\ y; x > y \end{cases};$$

$$\text{Max}(x, y) = \begin{cases} x; x >= y \\ y; x < y \end{cases}$$

Ceil(x) the smallest integer greater than or equal to x.
With respect to the example syntax used herein, the following definitions of logical operators may be applied:
  x && y Boolean logical "and" of x and y
  x | | y Boolean logical "or" of x and y
  ! Boolean logical "not"
  x ? y : z If x is TRUE or not equal to 0, evaluates to the value of y; otherwise, evaluates to the value of z.
Further, the following relational operators may be applied:

| | |
|---|---|
| > | Greater than |
| >= | Greater than or equal to |
| < | Less than |
| <= | Less than or equal to |
| == | Equal to |
| != | Not equal to |

Further, it should be noted that in the syntax descriptors used herein, the following descriptors may be applied:
  b(8): byte having any pattern of bit string (8 bits). The parsing process for this descriptor is specified by the return value of the function read_bits(8).
  f(n): fixed-pattern bit string using n bits written (from left to right) with the left bit first.

The parsing process for this descriptor is specified by the return value of the function read_bits(n).

u(n): unsigned integer using n bits.

ue(v): unsigned integer 0-th order Exp-Golomb-coded syntax element with the left bit first.

As described above, according to ITU-T H.265, each video frame or picture may be partitioned to include one or more slices and further partitioned to include one or more tiles. FIG. 2 is a conceptual diagram illustrating an example of a group of pictures including slices. In the example illustrated in FIG. 2, $Pic_4$ is illustrated as including two slices (i.e., $Slice_1$ and $Slice_2$) where each slice includes a sequence of CTUs (e.g., in raster scan order). It should be noted that a slice is a sequence of one or more slice segments starting with an independent slice segment and containing all subsequent dependent slice segments (if any) that precede the next independent slice segment (if any) within the same access unit. A slice segment, like a slice, is a sequence of coding tree units. In the examples described herein, in some cases the terms slice and slice segment may be used interchangeably to indicate a sequence of coding tree units. It should be noted that in ITU-T H.265, a tile may consist of coding tree units contained in more than one slice and a slice may consist of coding tree units contained in more than one tile. However, ITU-T H.265 provides that one or both of the following conditions shall be fulfilled: (1) All coding tree units in a slice belong to the same tile; and (2) All coding tree units in a tile belong to the same slice. Tile sets may be used to define boundaries for coding dependencies (e.g., intra-prediction dependencies, entropy encoding dependencies, etc.,) and as such, may enable parallelism in coding.

In ITU-T H.265, a coded video sequence (CVS) may be encapsulated (or structured) as a sequence of access units, where each access unit includes video data structured as network abstraction layer (NAL) units. In ITU-T H.265, a bitstream is described as including a sequence of NAL units forming one or more CVSs. It should be noted that ITU-T H.265 supports multi-layer extensions, including format range extensions (RExt), scalability (SHVC), multi-view (MV-HEVC), and 3-D (3D-HEVC). Multi-layer extensions enable a video presentation to include a base layer and one or more additional enhancement layers. For example, a base layer may enable a video presentation having a basic level of quality (e.g., High Definition rendering) to be presented and an enhancement layer may enable a video presentation having an enhanced level of quality (e.g., an Ultra High Definition rendering) to be presented. In ITU-T H.265, an enhancement layer may be coded by referencing a base layer. That is, for example, a picture in an enhancement layer may be coded (e.g., using inter prediction techniques) by referencing one or more pictures (including scaled versions thereof) in a base layer. In ITU-T H.265, each NAL unit may include an identifier indicating a layer of video data the NAL unit is associated with. It should be noted that sub-bitstream extraction may refer to a process where a device receiving a compliant bitstream forms a new compliant bitstream by discarding and/or modifying data in the received bitstream. For example, sub-bitstream extraction may be used to form a new compliant bitstream corresponding to a particular representation of video (e.g., a high quality representation).

Referring to the example illustrated in FIG. 2, each slice of video data included in $Pic_4$ (i.e., $Slice_1$ and $Slice_2$) is illustrated as being encapsulated in a NAL unit. In ITU-T H.265, each of a video sequence, a GOP, a picture, a slice, and CTU may be associated with metadata that describes video coding properties. ITU-T H.265 defines parameters sets that may be used to describe video data and/or video coding properties. In ITU-T H.265, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. Further, ITU-T H.265 enables supplemental enhancement information (SEI) messages to be signaled. In ITU-T H.265, SEI messages assist in processes related to decoding, display or other purposes, however, SEI messages may not be required for constructing the luma or chroma samples by the decoding process. In ITU-T H.265, SEI messages may be signaled in a bitstream using non-VCL NAL units. Further, SEI messages may be conveyed by some means other than by being present in the bitstream (i.e., signaled out-of-band).

Figure 3:
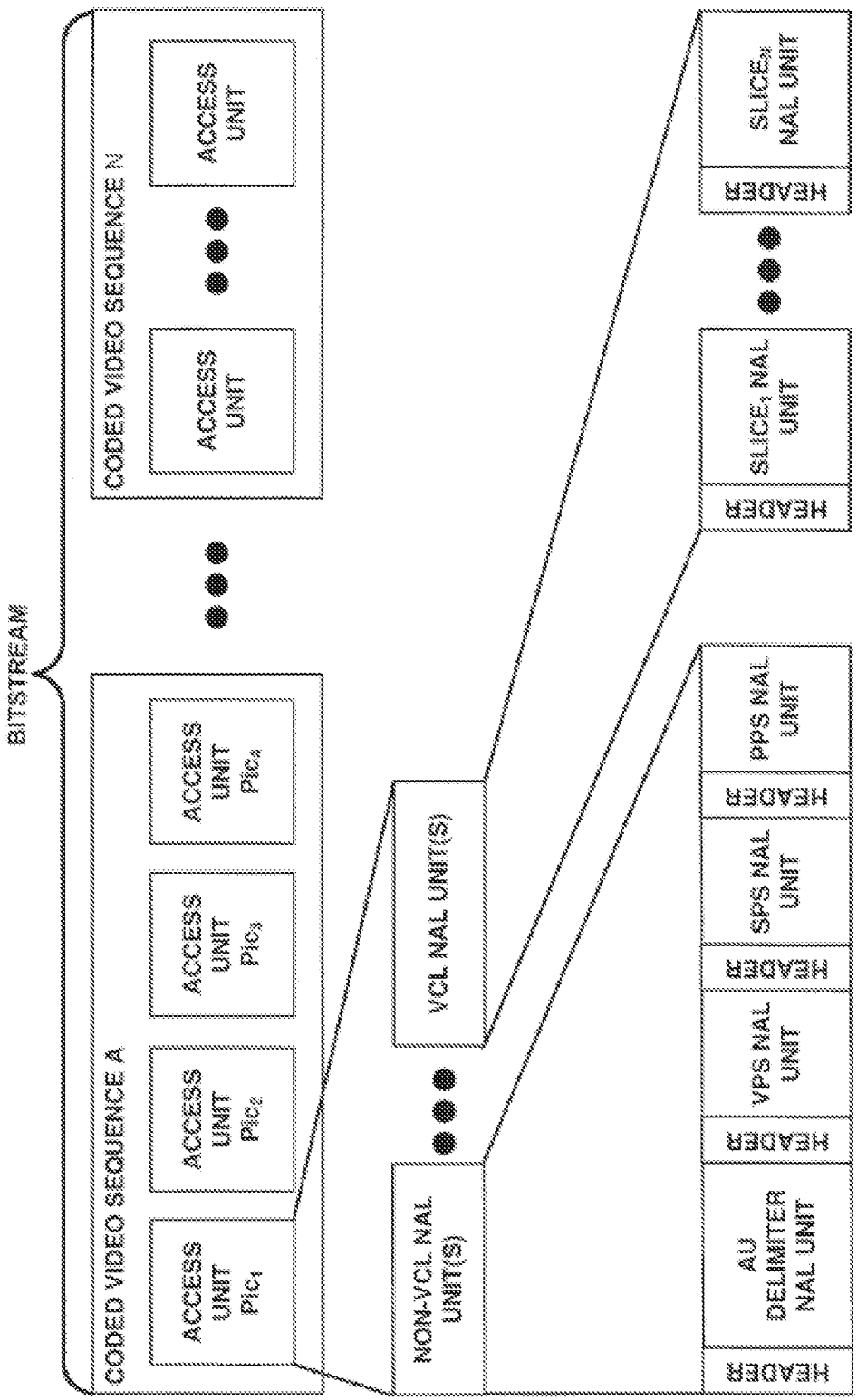
FIG. 3 is a conceptual diagram illustrating a data structure encapsulating coded video data and corresponding metadata according to one or more techniques of this disclosure.

FIG. 3 illustrates an example of a bitstream including multiple CVSs, where a CVS is represented by NAL units included in a respective access unit. In the example illustrated in FIG. 3, non-VCL NAL units include respective parameter set units (i.e., Video Parameter Sets (VPS), Sequence Parameter Sets (SPS), and Picture Parameter Set (PPS) units) and an access unit delimiter NAL unit. ITU-T H.265 defines NAL unit header semantics that specify the type of Raw Byte Sequence Payload (RBSP) data structure included in the NAL unit.

Table 1 illustrates the general NAL unit syntax provided in ITU-T H.265 and which is additionally used in JVET-K1001.

TABLE 1

| | Descriptor |
|---|---|
| nal_unit( NumBytesInNalUnit ) { | |
|   nal_unit_header( ) | |
|   NumBytesInRbsp = 0 | |
|   for( i = 2; i < NumBytesInNalUnit; i++ ) | |
|     if( i + 2 <NumBytesInNalUnit && next_bits( 24 ) = = 0x000003 ) { | |
|       rbsp_byte[ NumBytesInRbsp++ ] | b(8) |
|       rbsp_byte[ NumBytesInRbsp++ ] | b(8) |
|       i += 2 | |
|       emulation_prevention_three_byte /* equal to 0x03 */ | f(8) |
|     } else | |
|       rbsp_byte[ NumBytesInRbsp++ ] | b(8) |
| } | |

ITU-T H.265 provides the following general NAL unit semantics:

NumBytesInNalUnit specifies the size of the NAL unit in bytes. This value is required for decoding of the NAL unit. Some form of demarcation of NAL unit boundaries is necessary to enable inference of NumBytesInNalUnit. One such demarcation method is specified in [Annex B of ITU-T H.2651] for the byte stream format. Other methods of demarcation may be specified outside of this Specification.

NOTE 1—The video coding layer (VCL) is specified to efficiently represent the content of the video data. The NAL is specified to format that data and provide header information in a manner appropriate for conveyance on a variety of communication channels or storage media. All data are contained in NAL units, each of which contains an integer number of bytes. A NAL unit specifies a generic format for use in both packet-oriented and bitstream systems. The format of NAL units for both packet-oriented transport and byte stream is identical except that each NAL unit can be preceded by a start code prefix and extra padding bytes in the byte stream format specified [Annex B of ITU-T H.265].

rbsp_byte[i] is the i-th byte of an RBSP. An RBSP is specified as an ordered sequence of bytes as follows:
The RBSP contains an string of data bits (SODB) as follows:
  If the SODB is empty (i.e., zero bits in length), the RBSP is also empty.
  Otherwise, the RBSP contains the SODB as follows:
    1) The first byte of the RBSP contains the (most significant, left-most) eight bits of the SODB; the next byte of the RBSP contains the next eight bits of the SODB, etc., until fewer than eight bits of the SODB remain.
    2) rbsp_trailing_bits( ) are present after the SODB as follows:
      i) The first (most significant, left-most) bits of the final RBSP byte contains the remaining bits of the SODB (if any).
      ii) The next bit consists of a single rbsp_stop_one_bit equal to 1.
      iii) When the rbsp_stop_one_bit is not the last bit of a byte-aligned byte, one or more rbsp_alignment_zero_bit is present to result in byte alignment.
    3) One or more cabac_zero_word 16-bit syntax elements equal to 0x0000 may be present in some RBSPs after the rbsp_trailing_bits( ) at the end of the RBSP.
Syntax structures having these RBSP properties are denoted in the syntax tables using an "_rbsp" suffix. These structures are carried within NAL units as the content of the rbsp_byte[i] data bytes. The association of the RBSP syntax structures to the NAL units is as specified in [Table 3, herein].
  NOTE 2—When the boundaries of the RBSP are known, the decoder can extract the SODB from the RBSP by concatenating the bits of the bytes of the RBSP and discarding the rbsp_stop_one_bit, which is the last (least significant, right-most) bit equal to 1, and discarding any following (less significant, farther to the right) bits that follow it, which are equal to 0. The data necessary for the decoding process is contained in the SODB part of the RBSP.
emulation_prevention_three_byte is a byte equal to 0x03. When an emulation_prevention_three_byte is present in the NAL unit, it shall be discarded by the decoding process.

The last byte of the NAL unit shall not be equal to 0x00.
Within the NAL unit, the following three-byte sequences shall not occur at any byte-aligned position:
  0x000000
  0x000001
  0x000002
Within the NAL unit, any four-byte sequence that starts with 0x000003 other than the following sequences shall not occur at any byte aligned position:
  0x00000300
  0x00000301
  0x00000302
  0x00000303

Table 2 illustrates the NAL unit header syntax provided in ITU-T H.265.

TABLE 2

|  | Descriptor |
| --- | --- |
| nal_unit_header( ) { | |
|   forbidden_zero_bit | f(1) |
|   nal_unit_type | u(6) |
|   nuh_layer_id | u(6) |
|   nuh_temporal_id_plus1 | u(3) |
| } | |

ITU-T H.265 provides the following definitions for the respective syntax elements illustrated in Table 2.

forbidden_zero_bit shall be equal to 0.

nuh_layer_id specifies the identifier of the layer to which a VCL NAL unit belongs or the identifier of a layer to which a non-VCL NAL unit applies.

nuh_temporal_id_plus1 minus 1 specifies a temporal identifier for the NAL unit. The value of nuhtemporal_id plus1 shall not be equal to 0

With respect to nal_unit_type, nal_unit_type specifies the type of RBSP data structure contained in the NAL unit. Table 3 illustrates the NAL unit types provided in ITU-T H.265.

TABLE 3

| nal_unit_type | Name of nal_unit_type | Content of NAL unit and RBSP syntax structure | NAL unit type class |
| --- | --- | --- | --- |
| 0 | TRAIL_N | Coded slice segment of a non-TSA, non-STSA trailing picture slice_segment_layer_rbsp( ) | VCL |
| 1 | TRAIL_R |  | |
| 2 | TSA_N | Coded slice segment of a TSA picture slice_segment_layer_rbsp( ) | VCL |
| 3 | TSA_R |  | |
| 4 | STSA_N | Coded slice segment of a STSA picture slice_segment_layer_rbsp( ) | VCL |
| 5 | STSA_R |  | |
| 6 | RABL_N | Coded slice segment of a random access decodable leading (RADL) picture slice_segment_layer_rbsp( ) | VCL |
| 7 | RADL_R |  | |
| 8 | RASL_N | Coded slice segment of a random access skipped leading (RASL) picture slice_segment_layer_rbsp( ) | VCL |
| 9 | RASL_R |  | |
| 10 | RSV_VCL_N10 | Reserved non-IRAP SLNR VCL NAL unit types | VCL |
| 12 | RSV_VCL_N12 |  | |
| 14 | RSV_VCL_N14 |  | |
| 11 | RSV_VCL_R11 | Reserved non-IRAP sub-layer reference VCL NAL unit types | VCL |
| 13 | RSV_VCL_R13 |  | |
| 15 | RSV_VCL_R15 |  | |
| 16 | BLA_W_LP | Coded slice segment of a BLA picture slice_segment_layer_rbsp( ) | VCL |
| 17 | BIA_W_RADL |  | |
| 18 | BLA_N_LP |  | |

TABLE 3-continued

| nal_unit_type | Name of nal_unit_type | Content of NAL unit and RBSP syntax structure | NAL unit type class |
|---|---|---|---|
| 19 | IDR_W_RADL | Coded slice segment of a IDR picture slice_segment_layer_rbsp( ) | VCL |
| 20 | IDR_N_LP | | |
| 21 | CRA_NUT | Coded slice segment of a CRA picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24..31 | RSV_VCL24..RSV_VCL31 | Reserved non-IRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter Access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |
| 41..47 | RSV_NVCL41..RSV_NVCL47 | Reserved | non-VCL |
| 48..63 | UNSPEC48..TONSPEC63 | Unspecified | non-VCL |

For the sake of brevity, a complete description of each of the NAL units types in ITU-T H.265 is not provided herein. However, reference is made to the relevant sections of ITU-T H.265.

As described above, JVET-K1001 is a draft text of a video coding specification. Table 4 illustrates the syntax of the NAL unit header in JVET-K1001.

TABLE 4

| | Descriptor |
|---|---|
| nal_unit_header( ) { | |
|   forbidden_zero_bit | f(1) |
|   nal_unit_type | u(5) |
| } | |

JVET-K1001 provides the following definitions for the respective syntax elements illustrated in Table 4.
forbidden_zero_bit shall be equal to 0.
With respect to nal_unit_type, JVET-K1001 provides where the NAL unit types are yet to be defined.
JVET-K1001 further provides a basic sequence parameter set syntax. Table 5 illustrates the syntax of the sequence parameter set provided in JVET-K1001.

TABLE 5

| | Descriptor |
|---|---|
| seq_parameter_set_rbsp( ) { | |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   qtbtt_dual_tree_intra_flag | ue(v) |
|   log2_ctu_size_minus2 | ue(v) |
|   log2_min_qt_size_intra_slices_minus2 | ue(v) |
|   log2_min_qt_size_inter_slices_minus2 | ue(v) |
|   max_mtt_hierarchy_depth_inter_slices | ue(v) |
|   max_mtt_hierarchy_depth_intra_slices | ue(v) |
|   sps_cclm_enabled_flag | u(1) |
|   sps_temporal_mvp_enabled_flag | u(1) |
|   if( sps_temporal_mvp_enabled_flag ) | |
|     sps_sbtmvp_enabled_flag | u(1) |
|   if( sps_sbtmvp_enabled_flag ) | |
|     log2_sbtmvp_default_size_minus2 | u(1) |
|   sps_amvr_enabled_flag | u(1) |
|   sps_affine_enabled_flag | u(1) |
|   if( sps_affine_enabled_flag ) | |
|     sps_affine_type_flag | u(1) |
|   sps_mts_intra_enabled_flag | u(1) |
|   sps_mts_inter_enabled_flag | u(1) |
|   rbsp_trailing_bits( ) | |
| } | |

The basic definitions of the respective syntax elements illustrated in Table 5 are as follows:
sps_seq_parameter_set_id provides an identifier for the SPS for reference by other syntax elements. The value of sps_seq_parameter_set_id shall be in the range of 0 to 15, inclusive.
chroma_format_idc specifies the chroma sampling relative to the luma sampling. The value of chroma_format_idc shall be in the range of 0 to 3, inclusive.
separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

pic_width_in_luma_samples specifies the width of each decoded picture in units of luma samples.

pic_height_in_luma_samples specifies the height of each decoded picture in units of luma samples.

bit_depth_luma_minus8 specifies the bit depth of the samples of the luma array and the value of the luma quantization parameter range offset.

bit_depth_chroma_minus8 specifies the bit depth of the samples of the chroma arrays and the value of the chroma quantization parameter range offset.

qtbtt_dual_tree_intra_flag equal to 1 specifies that for I slices, each CTU is split into coding units with 64×64 luma samples using an implicit quadtree split and that these coding units are the root of two separate coding_quadtree syntax structure for luma and chroma.

log2_ctu_size_minus2 plus 2 specifies the luma coding tree block size of each CTU.

log2_min_qt_size_intra_slices_minus2 plus 2 specifies the minimum luma size of a leaf block resulting from quadtree splitting of a CTU in slices with slice_type equal to 2 (I).

log2_min_qt_size_inter_slices_minus2 plus 2 specifies the minimum luma size of a leaf block resulting from quadtree splitting of a CTU in slices with slice_type equal to 0 (B) or 1 (P).

max_mtt_hierarchy_depth_inter_slices specifies the maximum hierarchy depth for coding units resulting from multi-type tree splitting of a quadtree leaf in slices with slice_type equal to 0 (B) or 1 (P).

max_mtt_hierarchy_depth_intra_slices specifies the maximum hierarchy depth for coding units resulting from multi-type tree splitting of a quadtree leaf in slices with slice_type equal to 2 (I).

sps_cclm_enabled_flag equal to 0 specifies that the cross-component linear model intra prediction from luma component to chroma component is disabled. sps_cclm_enabled_flag equal to 1 specifies that the cross-component linear model intra prediction from luma component to chroma component is enabled.

sps_temporal_mvp_enabled_flag equal to 1 specifies that slice_temporal_mvp_enabled_flag is present in the slice headers of slices with slice_type not equal to I in the CVS. sps_temporal_mvp_enabled_flag equal to 0 specifies that slice_temporal_mvp_enabled_flag is not present in slice headers and that temporal motion vector predictors are not used in the CVS.

sps_sbtmvp_enabled_flag equal to 1 specifies that subblock-based temporal motion vector predictors may be used in decoding of pictures with all slices having slice_type not equal to I in the CVS. sps_sbtmvp_enabled_flag equal to 0 specifies that subblock-based temporal motion vector predictors are not used in the CVS. When sps_sbtmvp_enabled_ flag is not present, it is inferred to be equal to 0.

log2_sbtmvp_default_size_minus2 specifies the inferred value of the syntax element log2_sbtmvp_active_size_minus2 in the slice headers of slices with slice_type not equal to I in the CVS when slice_sbtmvp_size_override_flag is equal to 0.

sps_amvr_enabled_flag equal to 1 specifies that adaptive motion vector difference resolution is used in motion vector coding. amvr_enabled_flag equal to 0 specifies that adaptive motion vector difference resolution is not used in motion vector coding.

sps_affine_enabled_flag specifies whether affine model based motion compensation can be used for inter prediction. If sps_affine_enabled_flag is equal to 0, the syntax shall be constrained such that no affine model based motion compensation is used in the CVS, and merge_affine_flag, inter_affine_flag and cu_affine_type_flag are not present in coding unit syntax of the CVS. Otherwise (sps_affine_enabled_flag is equal to 1), affine model based motion compensation can be used in the CVS.

sps_affine_type_flag specifies whether 6-parameter affine model based motion compensation can be used for inter prediction. If sps_affine_type_flag is equal to 0, the syntax shall be constrained such that no 6-parameter affine model based motion compensation is used in the CVS, and cu_affine_type_flag is not present in coding unit syntax in the CVS. Otherwise (sps_affine_type_flag is equal to 1), 6-parameter affine model based motion compensation can be used in the CVS. When not present, the value of sps_affine_type_flag is inferred to be equal to 0.

sps_mts_intra_enabled_flag equal to 1 specifies that cu_mts_ flag may be present in the residual coding syntax for intra coding units. sps_mts_intra_enabled_flag equal to 0 specifies that cu_mts_flag is not present in the residual coding syntax for intra coding units.

sps_mts_inter_enabled_flag specifies that cu_mts_flag may be present in the residual coding syntax for inter coding units. sps_mts_inter_enabled_flag equal to 0 specifies that cu_mts_flag is not present in the residual coding syntax for inter coding units.

JVET-K1001 further provides a basic picture parameter set syntax. Table 6 illustrates the syntax of the picture parameter set in JVET-K1001.

TABLE 6

| | Descriptor |
|---|---|
| pic_parameter_set_rbsp( ) { | |
|     pps_pic_parameter_set_id | ue(v) |
|     pps_seq_parameter_set_id | ue(v) |
|     transform_skip_enable_flag | u(1) |
|     rbsp_trailing_bits( ) | |
| } | |

JVET-K1001 provides the following definitions for the respective syntax elements illustrated in Table 6.

pps_pic_parameter_set_id identifies the PPS for reference by other syntax elements. The value of pps_pic_parameter_set_id shall be in the range of 0 to 63, inclusive.

pps_seq_parameter_set_id specifies the value of sps_seq_parameter_set_id for the active SPS. The value of pps_seq_parameter_set_id shall be in the range of 0 to 15, inclusive.

transform_skip_enabled_flag equal to 1 specifies that transform_skip_flag may be present in the residual coding syntax. transform_skip_enabled_flag equal to 0 specifies that transform_skip_flag is not present in the residual coding syntax.

JVET-K1001 further provides an access unit delimiter syntax. Table 7 illustrates the syntax of the access unit delimiter in JVET-K1001.

TABLE 7

| | Descriptor |
|---|---|
| access_unit_delimiter_rbsp( ) {<br>   pic_type<br>   rbsp_trailing_bits( )<br>} | u(3) |

JVET-K1001 provides the following definitions for the respective syntax elements illustrated in Table 7.

pic_type indicates that the slice_type values for all slices of the coded picture in the access unit containing the access unit delimiter NAL unit are members of the set listed in Table 8 for the given value of pic_type. The value of pic_type shall be equal to 0, 1 or 2 in bitstreams conforming to this version of this Specification. Other values of pic_type are reserved for future use. Decoders conforming to this version of this Specification shall ignore reserved values of pic_type.

TABLE 8

| pic_type | slice_type values that may be present in the coded picture |
|---|---|
| 0 | I |
| 1 | P, I |
| 2 | B, P, I |

It should be noted that a B slice refers to a slice where bi-prediction inter prediction, uni-prediction inter prediction, and intra predication are allowed; a P slice refers to a slice where uni-prediction inter prediction, and intra predication are allowed; and an I slice refers where only intra predication is allowed. It should be noted that in some cases B and P slices are collectively referred to as inter slices.

JVET-K1001 further provides an end of sequence syntax, an end of bitstream syntax, and a filler data syntax. Table 9 illustrates the end of sequence syntax provided in JVET-K1001, Table 10 illustrates the end of bitstream syntax provided in JVET-K1001, and Table 11 illustrates the end of bitstream syntax provided in JVET-K1001.

TABLE 9

| | Descriptor |
|---|---|
| end_of_seq_rbsp( ) {<br>} | |

TABLE 10

| | Descriptor |
|---|---|
| end_of_bitstream_rbsp( ) {<br>} | |

TABLE 11

| | Descriptor |
|---|---|
| filler_data_fbsp( ) {<br>  while( next_bits( 8 ) = = 0xFF )<br>    ff_byte /* equal to 0xFF */<br>  rbsp_trailing_bits( )<br>} | f(8) |

JVET-K1001 provides the following definitions for the respective syntax elements illustrated in Table 11.

ff_byte is a byte equal to 0xFF.

JVET-K1001 further provides a slice layer syntax including a slice header. Table 12 illustrates the slice layer syntax provided in JVET-JK001 and Table 13 illustrates the slice header provided in JVET-K1001.

TABLE 12

| | Descriptor |
|---|---|
| slice_layer_rbsp( ) {<br>  slice_header( )<br>  slice_data( )<br>  rbsp_slice_trailing_bits( )<br>} | |

TABLE 13

| | Descriptor |
|---|---|
| slice_header( ) { | |
|   slice_pic_parameter_set_id | ue(v) |
|   slice_address | u(v) |
|   slice_type | ue(v) |
|   if( slice_type != I ) { | |
|     log2_diff_ctu_max_bt_size | ue(v) |
|     if( sps_sbtmvp_enabled_flag ) { | |
|       sbtmvp_size_override_flag | u(1) |
|       if( sbtmvp_size_override_flag ) | |
|         log2_sbtmvp_active_size_minus2 | u(3) |
|     } | |
|     if( sps_temporal_mvp_enabled_flag ) | |
|       slice_temporal_mvp_enabled_flag | u(1) |
|     if( slice_type = = B ) | |
|       mvd_l1_zero_flag | u(1) |
|     if( slice_temporal_mvp_enabled_flag ) { | |
|       if( slice_type == B ) | |
|         collocated_from_l0_flag | u(1) |
|     } | |
|     six_minus_max_num_merge_cand | ue(v) |
|   } | |
|   dep_quant_enabled_flag | u(1) |
|   if( ! dep_quant_enabled_flag ) | |
|     sign_data_hiding_enabled_flag | u(1) |
|   byte_alignment( ) | |
| } | |

JVET-K1001 provides the following definitions for the respective syntax elements illustrated in Table 13.

slice_pic_parameter_set_id specifies the value of pps_pic_parameter_set_id for the PPS in use. The value of slice_pic_parameter_set_id shall be in the range of 0 to 63, inclusive.

slice_address specifies the address of the first CTB in the slice, in CTB raster scan of a picture.

slice_type specifies the coding type of the slice according to Table 14.

TABLE 14

| slice_type | Name of slice_type |
|---|---|
| 0 | B (B slice) |
| 1 | P (P slice) |
| 2 | I (I slice) |

When nal_unit_type has a value in the range of [to be determined], inclusive, i.e., the picture is an IRAP picture, slice_type shall be equal to 2.

log2_diff_ctu_max_bt_size specifies the difference between the luma CTB size and the maximum luma size (width or height) of a coding block that can be split using a binary split.

sbtmvp_size_override_flag equal to 1 specifies that the syntax element log2_sbtmvp_active_size_minus2 is present for the current slice. sbtmvp_size_override_flag equal to 0 specifies that the syntax element log2_atmvp_active_size_minus2 is not present and log2_sbtmvp_size_active_minus2 is inferred to be equal to log2_sbtmvp_default_size_minus2.

log2_sbtmvp_active_size_minus2 plus 2 specifies the value of the subblock size that is used for deriving the motion parameters for the subblock-based TMVP of the current slice. When log2_sbtmvp_size_active_minus2 is not present, it is inferred to be equal to log2_sbtmvp_default_size_minus2. The variable is derived as follows:

Log2SbtmvpSize=log2_sbtmvp_size_active_minus2+2 slice_temporal_mvp_enabled_flag specifies whether temporal motion vector predictors can be used for inter prediction. If slice_temporal_mvp_enabled_flag is equal to 0, the syntax elements of the current picture shall be constrained such that no temporal motion vector predictor is used in decoding of the current picture. Otherwise (slice_temporal_mvp_enabled_flag is equal to 1), temporal motion vector predictors may be used in decoding of the current picture. When not present, the value of slice_temporal_mvp_enabled_flag is inferred to be equal to 0.

mvd_l1_zero_flag equal to 1 indicates that the mvd_coding (x0, y0, 1) syntax structure is not parsed and MvdL1 [x0][y0][compIdx] I is set equal to 0 for compIdx=0..1. mvd_l1_zero_flag equal to 0 indicates that the mvd_coding (x0, y0, 1) syntax structure is parsed.

collocated_from_l0_flag equal to 1 specifies that the collocated picture used for temporal motion vector prediction is derived from reference picture list 0. collocated_from_l0_flag equal to 0 specifies that the collocated picture used for temporal motion vector prediction is derived from reference picture list 1. When collocated_from_l0_flag is not present, it is inferred to be equal to 1.

six_minus_max_num_merge_cand specifies the maximum number of merging motion vector prediction (MVP) candidates supported in the slice subtracted from 6. The maximum number of merging MVP candidates, MaxNumMergeCand is derived as follows:

MaxNumMergeCand=6−six_minus_max_num_merge_cand

The value of MaxNumMergeCand shall be in the range of 1 to 6, inclusive.

dep_quant_enabled_flag equal to 0 specifies that dependent quantization is disabled. dep_quant_enabled_flag equal to 1 specifies that dependent quantization is enabled.

sign_data_hiding_enabled_flag equal to 0 specifies that sign bit hiding is disabled. sign_data_hiding_enabled_flag equal to 1 specifies that sign bit hiding is enabled. When sign_data_hiding_enabled_flag is not present, it is inferred to be equal to 0.

JVET-K1001 further provides an RBSP trailing bits syntax and byte alignment syntax. Table 15 illustrates the RBSP trailing bits syntax provided in JVET-K1001 and Table 16 illustrates the byte alignment syntax provided in JVET-K1001.

TABLE 15

|  | Descriptor |
|---|---|
| rbsp_trailing_bits( ) { | |
|   rbsp_stop_one_bit /* equal to 1 */ | f(1) |
|   while( !byte_aligned( ) ) | |
|     rbsp_alignment_zero_bit /* equal to 0 */ | f(1) |
| } | |

TABLE 16

|  | Descriptor |
|---|---|
| byte_alignment( ) { | |
|   alignment_bit_equal_to_one /* equal to 1 */ | f(1) |
|   while( !byte_aligned( ) ) | |
|     alignment_bit_equal_to_zero /* equal to 0 */ | f(1) |
| } | |

As described above, according to ITU-T H.265, each video frame or picture may be partitioned to include one or more tiles. In ITU-T H.265, a tile structure for a picture is signaled using a Picture Parameter Set. Table 17 is a portion of the syntax of the PPS specified in ITU-T H.265 including the relevant syntax elements for signaling a tile structure.

TABLE 17

|  | Descriptor |
|---|---|
| pic_parameter_set_rbsp( ) { | |
| ... | |
|   tiles_enabled_flag | u(1) |
| ... | |
|   if( tiles_enabled_flag) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|       for( i = 0; i < num_tiles_columns_minus1; i++ ) | |
|         column_width_minus1[i ] | ue(v) |
|       for( i = 0; i < num_tiles_rows_minus1; i++ ) | |
|         row_height_minus1[i ] | ue(v) |
|     } | |
| ... | |

ITU-T H.265 provides the following definitions for the respective syntax elements illustrated in Table 17.

tiles_enabled_flag equal to 1 specifies that there is more than one tile in each picture referring to the PPS. tiles_enabled_flag equal to 0 specifies that there is only one tile in each picture referring to the PPS. It is a requirement of bitstream conformance that the value of tiles_enabled_flag shall be the same for all PPSs that are activated within a CVS.

num_tile_columns_minus1 plus 1 specifies the number of tile columns partitioning the picture. num_tile_columns_minus1 shall be in the range of 0 to PicWidthInCtbsY-1, inclusive. When not present, the value of num_tile_columns_minus1 is inferred to be equal to 0.

num_tile_rows_minus1 plus 1 specifies the number of tile rows partitioning the picture. num_tile_rows_minus1 shall be in the range of 0 to PicHeightInCtbsY-1, inclusive. When not present, the value of num_tile_rows_minus1 is inferred to be equal to 0. When tiles_enabled_flag is equal to 1, num_tile_columns_minus1 and num_tile_rows_minus1 shall not be both equal to 0.

uniform_spacing_flag equal to 1 specifies that tile column boundaries and likewise tile row boundaries are distributed uniformly across the picture. uniform_spacing_flag equal to 0 specifies that tile column boundaries and likewise tile row boundaries are not distributed uniformly across the picture but signalled explicitly using the syntax elements column_width_minus1 [i] and row_height_minus1 [i]. When not present, the value of uniform_spacing_flag is inferred to be equal to 1.

column_width_minus1[i] plus 1 specifies the width of the i-th tile column in units of coding tree blocks.

row_height_minus1[i] plus 1 specifies the height of the i-th tile row in units of coding tree blocks.

As provided above, JVET-K1001 does not provide a mechanism for signaling a tile structure. This disclosure describes techniques for signaling overall bitstream structure including picture header and tile set parameters.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random-access memories (DRAM), and static random-access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
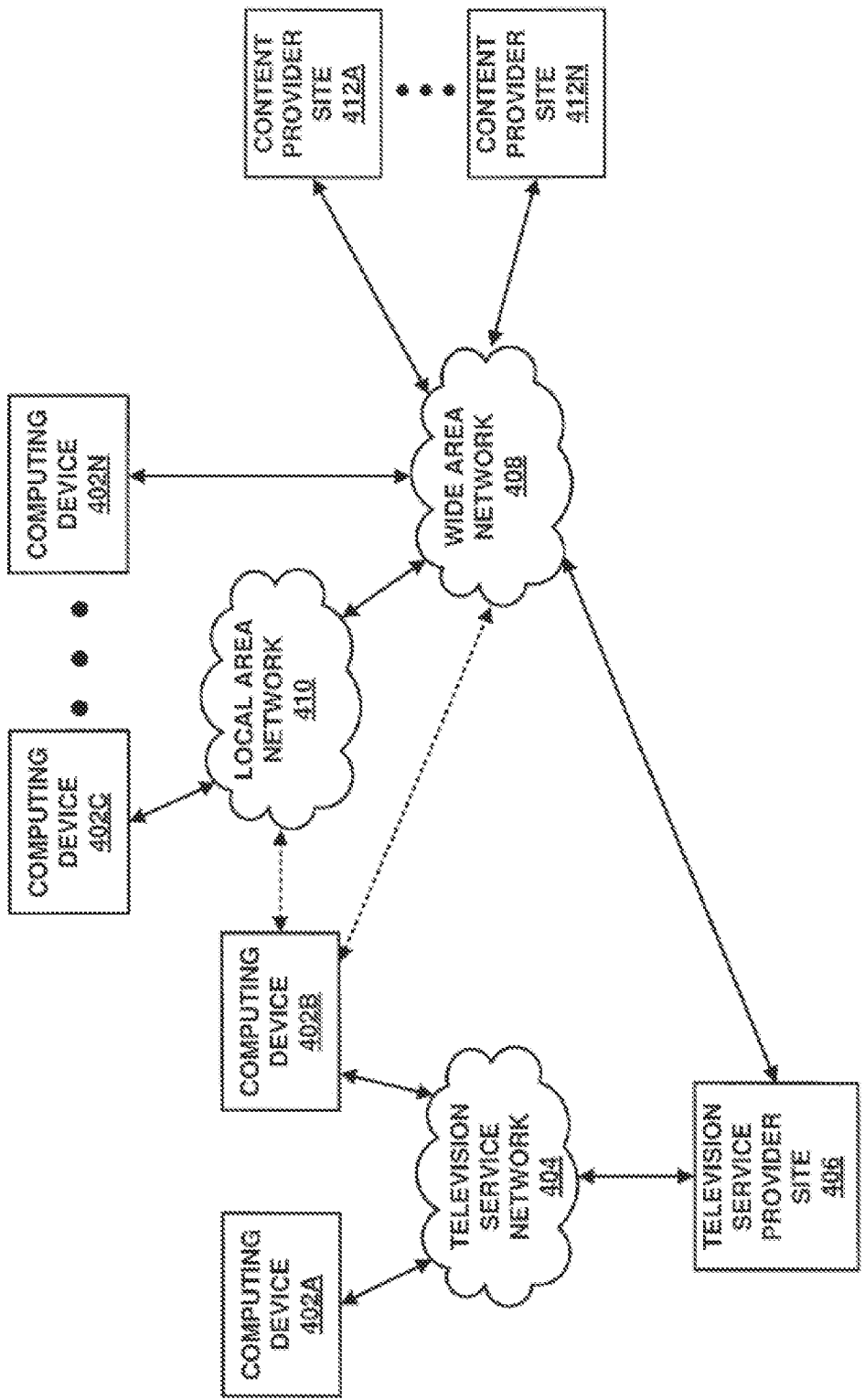
FIG. 4 is a conceptual drawing illustrating an example of components that may be included in an implementation of a system that may be configured to encode and decode video data according to one or more techniques of this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code-division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext-based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
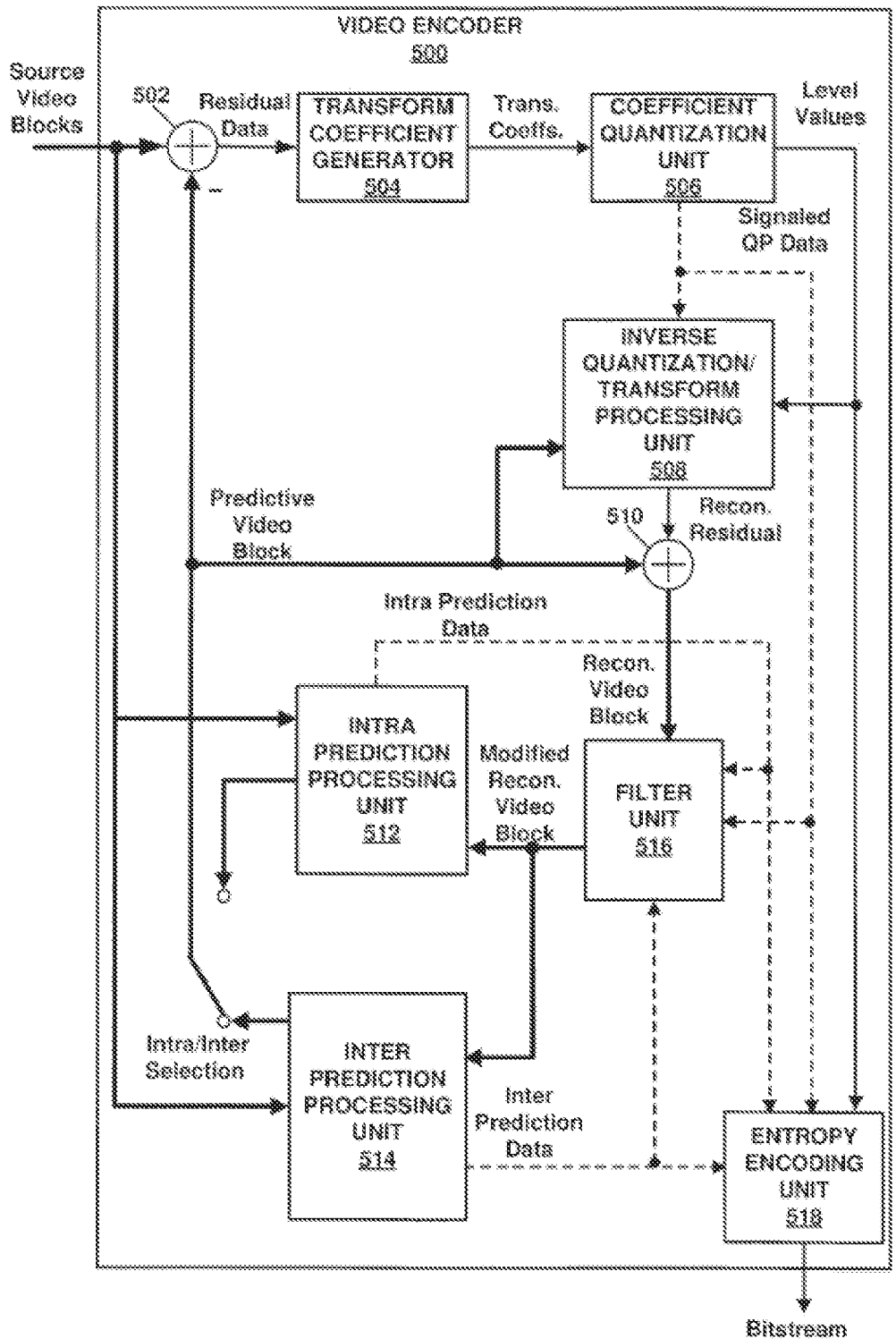
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a predication mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclose.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream.

Figure 7:
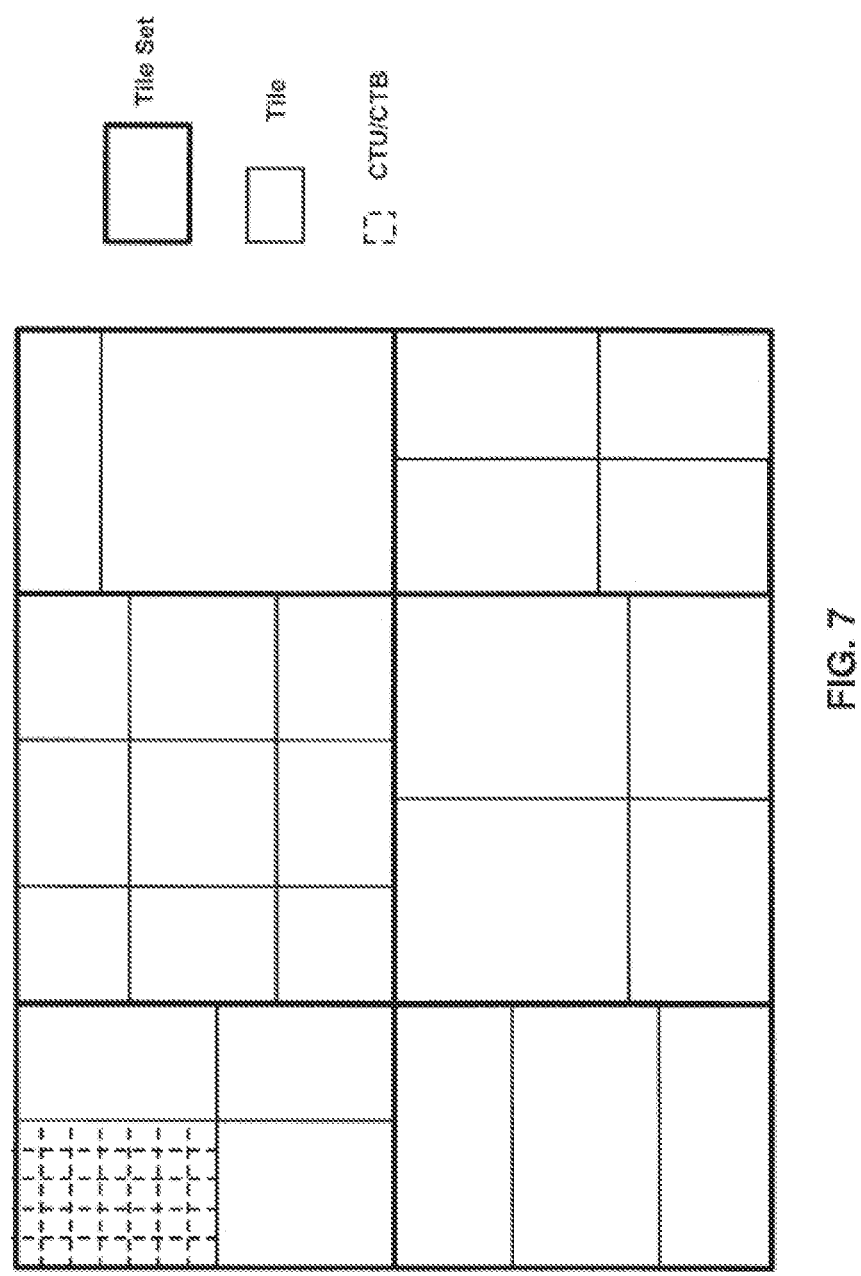
FIG. 7 is a conceptual diagram illustrating coded video data and corresponding data structures according to one or more techniques of this disclosure.

In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4. In one example, a picture may be partitioned into tile sets and tiles, where a tile set is sequence of tiles and a tile is a sequence of coding tree unit. A tile set may cover a rectangular region of a picture. FIG. 7 illustrates an example a picture divided into six tile sets. In the example illustrated in FIG. 7 each tile set is rectangular. Each tile set may have different number of tiles arranged in different number of columns of tiles and columns of rows. Although in another example each tileset may have same number of tiles. Additionally, the number of tiles columns and number of tile rows in each tile set may be changed in each picture. A flag may be signaled to indicate that the number of tile columns and number of tile rows in each tile set is fixed in a coded video sequence. It should be noted that "tile set" may instead be called "slice." As such, the term "tile set" or "tileset" and "slice" may be used interchangeably.

As described above, Table 4 illustrates the general NAL unit syntax provided in JVET-K1001. As further, described above, JVET-K1001 provides where the NAL unit types are yet to be defined. It should be noted, however, "On High Level Syntax Starting Point," 11th Meeting of ISO/IEC JTC1/SC29/WG11 10-18 Jul. 2018, Ljubljana, SI, document JVET-K0325, which is incorporated by reference herein, and referred to as JVET-K0325, provides NAL unit types to be added to JVET-K1001. that In one example, according to the techniques described herein, data encapsulator 107 may be configured to signal one or more of the NAL unit types included in Table 18.

TABLE 18

| Nal_unit_type | Name of nal_unit_type | Content of NAL unit and RBSP syntax structure | NAL unit type class |
| --- | --- | --- | --- |
| 0 | NONIRAP_NUT | Coded tile set-of a non-IRAP picture tileset_layer_rbsp( ) | VCL |
| 1 | IRAP_NUT | Coded tile set-of an IRAP picture tileset_layer_rbsp( ) | VCL |
| 2 | PICH_NUT | Picture header of a picture pic_header_rbsp( ) | VCL |
| 3-15 | RSV_VCL_NUT | Reserved VCL NAL Units | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | EOS__NUT | End of sequence end_of_seq_rbsp( ) | non-VCL |
| 19 | EOB_NUT | End of bitstream end_of_bitstream_rbsp( ) | non-VCL |
| 20, 12 | PREFIX_SEI_NUT SUFFIX_SEI_NUT | Supplemental enhancement information sei_rbsp( ) | non-VCL |
| 22-26 | RSV_NVCL | Reserved | non-VCL |
| 27-31 | UNSPEC | Unspecified | non-VCL |

With respect to Table 18, the following may be defined:
intra random access point (IRAP) picture: A coded picture for which each VOL NAL unit has nal_unit_type equal to IRAP_NUT.
non-IRAP picture: A coded picture for which each VCL NAL unit has nal_unit_type equal to NON_IRAP_NUT.
Signaling a picture header as an NAL unit is shown in Table 18. Signaling syntax parameters in picture header and allowing over-riding them in tile set header could allow bit-savings and still support flexibility. In some examples, according to the techniques herein, the same picture header may apply to multiple pictures. This can provide additional bit saving. Furtherin, having a picture header as its own NAL unit makes it easy for multiple pictures to refer to the same picture header.

A tile parameter related header may have following aspects: 1. It can apply to more than one tile—e.g., to a tile set or a collection of tiles, thus, it may be a tile set header; and/or 2. It can selectively over-ride some of the parameters from picture header as required. This could be controlled by a set of presence flags in the tile set header.

It should be noted that in an alternative example, PICH_NUT may be a non-VCL NAL unit which is activated for each picture/tileset. For example the NAL unit table in this case may be as shown in Table 18A:

TABLE 18A

| Nal_unit_type | Name of nal_unit_type | Content of NAL unit and RBSP syntax structure | NAL unit type class |
| --- | --- | --- | --- |
| 0 | NONIRAP_NUT | Coded tile set-of a non-IRAP picture tileset_layer_rbsp( ) | VCL |
| 1 | IRAP_NUT | Coded tile set-of an IRAP picture tileset_layer_rbsp( ) | VCL |
| 2-15 | RSV_VCL_NUT | Reserved VCL NAL Units | VCL |
| 16 | SPS_NUT | Sequence parameter set seq_paramcter_set_rbsp( ) | non-VCL |
| 17 | PPS_NUT | Picture parameter set pic_parameter_set_rbsp( ) | non-VCL |
| 18 | PICH_NUT | Picture header of a picture pic_header_rbsp( ) | non-VCL |
| 19 | EOS_NUT | End of sequence end_of_seq_rbsp( ) | non-VCL |
| 20 | EOB_NUT | End of bitstream end_of_bitstream_rbsp( ) | non-VCL |
| 21, 22 | PREFIX_SEI_NUT SUFFIX_SEI_NUT | Supplemental enhancement information sei_rbsp( ) | non-VCL |
| 23-26 | RSV_NVCL | Reserved | non-VCL |
| 27-31 | UNSPEC | Unspecified | non-VCL |

In one example, the following definitions of tile, tile column, tile row, and tile set may be used. It should be noted that the word "tileset" and "tile set" is used interchangeably and may mean the same thing.

tile: A rectangular region of coded tree blocks (CTB) within a particular tile column and a particular tile row in a picture.

tile column: A rectangular region of CTBs having a height equal to the height of the picture and a width specified by syntax elements in the picture parameter set.

tile row: A rectangular region of CTBs having a height specified by syntax elements in the picture parameter set and a width equal to the width of the picture.

tile set: A collection of one or more tiles. In one example, a tile set shall be rectangular in shape. A tile set may include only integer number of contiguous tiles. In one example in a tile set each tile must be contiguous with one other tile along column or row dimension or the tile set must have only one tile.

In one example, NONIRAP_NUT may be a Coded non-IRAP tile set tileset_layer_rbsp( ) and IRAP_NUT may be a Coded IRAP tile set tileset_layer_rbsp( ) A Bitstream obtained by a sub-bitstream extraction process which extracts only data for the IRAP tile set can be independently decoded. The first picture or sub-picture in this extracted bitstream corresponding to the tile set is an IRAP picture or sub-picture.

Table 19 illustrates an example of tileset_layer_rbsp( ) syntax which may be signaled by data encapsulator 107 according to the techniques herein.

TABLE 19

| | Descriptor |
|---|---|
| tileset_layer_rbsp( ) { | |
|     tileset_header( ) | |
|     tileset_data( ) | |
|     rbsp_tileset_trailing_bits( ) | |
| } | |

Table 20 illustrates an example of tileset_header( ) syntax which may be signaled by data encapsulator 107 according to the techniques herein.

TABLE 20

| | Descriptor |
|---|---|
| tileset_header( ) { | |
|     ts_pic_header_id | ue(v) |
|     tile_set_id | ue(v) |
|     first_tile_id | ue(v) |
|     num_tiles_in_setdata | ue(v) |
|         tileset_coding_param( ) | |
| } | |

With respect to Table 20, the respective syntax elements may be based on the following definitions:

ts_pic_header_id specifies the value of pic_header_id for the picture header that applies to this tile set. The value of ts_pic_header_id shall be in the range of 0 to $2^{32}$-1, inclusive.

tile_set_id specifies the tile set identifier of this tile set.

first_tile_id specifies the TileId (tile identifier) of the first tile in the tile set with identifier tile_set_id that is present in the tileset_data( ) that follows this tileset_header( ).

num_tiles_in_setdata specifies the number of tiles in the tile set with identifier tile_set_id that are present in the tileset_data( ) that follows this tileset_header( ).

Table 21 illustrates an example of tileset_header( ) syntax which may be signaled by data encapsulator 107 according to the techniques herein.

TABLE 21

| | Descriptor |
|---|---|
| tileset_header( ) { | |
|     ts_pic_header_id | ue(v) |
|     first_tile_set_id | ue(v) |
|     num_tile_set_ids_minus1 | ue(v) |
|     first_tile_id_in_first_tileset | ue(v) |
|     num_tiles_in_setdata_in_last_tileset | ue(v) |
|         tileset_coding_params( ) | |
| } | |

With respect to Table 21, the respective syntax elements may be based on the following definitions:

ts_pic_header_id specifies the value of pic_header_id for the picture header that applies to this tile set. The value of ts_pic_header_id shall be in the range of 0 to $2^{32}$-1, inclusive.

first_tile_set_id specifies the tile set identifier of the first tile set in the tileset_data( ) that follows the tileset_header( ).

num_tile_set_ids_minus1 plus 1 specifies the number of tile sets that are present in the tileset_data( ) that follows this tileset_header( ).

first_tile_id_in_first_tileset specifies the TileId (tile identifier) of the first tile in the first tile set that is present in the tileset_data( ) that follows this tileset_header( ).

num_tiles_in_setdata_in_last_tileset specifies the number of tiles in the last tile set that are present in the tileset_data( ) that follows this tileset_header( ).

Table 22 illustrates an example of tileset_header( ) syntax which may be signaled by data encapsulator 107 according to the techniques herein.

TABLE 22

| | Descriptor |
|---|---|
| tileset_header( ) { | |
|     first_tile_set_id | ue(v) |
|     num_tile_set_ids_minus1 | ue(v) |
|     first_tile_id_in_first_tileset | ue(v) |
|     if(num_tile_set_ids_minus1==0) | |
|         num_tiles_in_setdata_in_first_tileset | ue(v) |
|     else if(num_tile_set_ids_minus1>0) | |
|         num_tiles_in_setdata_in_last_tileset | ue(v) |
|     tileset_coding_params( ) | |
| } | |

With respect to Table 22, the respective syntax elements may be based on the following definitions:

first_tile_set_id specifies the tile set identifer of the first tile set in the tileset_data( ) that follows this tileset_header( ).

num_tile_set_ids_minus1 plus 1 specifies the number of tile sets that are present in the tileset_data( ) that follows this tileset_header( ).

first_tile_id_in_first_tileset specifies the TileId (tile identifier) of the first tile in the first tile set that is present in the tileset_data( ) that follows this tileset_header( ).

num_tiles_in_setdata_in_first_tileset specifies the number of tiles in the first tile set that are present in the tileset_data( ) that follows this tileset_header( ).

num_tiles_in_setdata_in_last_tileset specifies the number of tiles in the last tile set that are present in the tileset_data( ) that follows this tileset_header( ).

Table 22A illustrates an example of tileset_header( ) syntax which may be signaled by data encapsulator 107 according to the techniques herein. In this example only complete integer number of tile sets are included in tileset_data( ). This requires signaling fwer syntax elements in the tilset_header( ).

TABLE 22A

| | Descriptor |
|---|---|
| tileset_header( ) { | |
|     ts_pic_header_id | ue(v) |
|     first_tile_set_id | ue(v) |
|     num_tile_set_ids_minus1 | ue(v) |
|         tileset_coding_params( ) | |
| } | |

With respect to Table 22A, the respective syntax elements may be based on the following definitions:

first_tile_set_id specifies the tile set identifer of the first tile set in the tileset_data( ) that follows the tileset_header( ).

num_tile_set_ids_minus1 plus 1 specifies the number of tile sets that are present in the tileset_data( ) that follows this tileset_header( ).

Table 23 illustrates an example of tileset_coding_parameters( ) syntax which may be signaled by data encapsulator 107 according to the techniques herein.

TABLE 23

```
tileset_coding_params( ) {
  if( picture_type != I ) {
            tileset_log2_diff_ctu_max_bt_size_present_flag
            if(tileset_log2_diff_ctu_max_bt_size_present_flag)
              tileset_log2_diff_ctu_max_bt_size                                ue(v)
        if( sps_sbtmvp_enabled_flag && sbtmvp_size_override_flag   ) {
            tileset_sbtmvp_size_override_flag_present_flag
            if(tileset_sbtmvp_size_override_flag_present_flag) {
              tileset_sbtmvp_size_override_flag
          if( tilset_sbtmvp_size_override_flag )
            log2_tileset_sbtmvp_active_size_minus2                             u(3)
        }
       }
            tileset_tmvp_info_present_flag
            if(tileset_tmvp_info_present_flag) {
        if(pic_temporal_mvp_enabled_flag)
              tileset_temporal_mvp_enabled_flag                                u(1)
        if(picture_type == B )
              tileset_mvd_l1_zero_flag                                         u(1)
        if(tileset_temporal_mvp_enabled_flag ) {
            if( picture_type == B )
              tileset_collocated_from_l0_flag                                  u(1)
        }
       }
            tileset_six_minus_max_num_merge_cand_present_flag
            if(tileset_six_minus_max_num_merge_cand_present_flag)
            tileset_six_minus_max_num_merge_cand                               ue(v)
  }
  if(dep_quant_enabled_flag)
            tileset_dep_quant_info_present_flag
            if(tileset_dep_quant_info_present_flag) {
            tileset_dep_quant_enabled_flag                                     u(1)
            if( !dep_quant_enabled_flag || !tileset_dep_quant_enabled_flag)
              tileset_sign_data_hiding_enabled_flag                            u(1)
       }
  byte_alignment( )
}
```

With respect to Table 23, the respective syntax elements may be based on the following definitions:

tileset_log2_diff_ctu_max_bt_size_present_flag equal to 1 specifies that tileset_log2_diff_ctu_max_bt_size is present. tileset_log2_diff_ctu_max_bt_size_present_flag equal to 0 specifies that tileset_log2_diff_ctu_max_bt_size is not present. When not present tileset_log2_diff_ctu_max_bt_size is inferred to be equal to log2_diff_ctu_max_bt_size from the pic_header( ) structure corresponding to the ts_pic_header_id in this tilset_header( ) active for this tile set.

tileset_log2_diff_ctu_max_bt_size specifies the difference between the luma CTB size and the maximum luma size (width or height) of a coding block that can be split using a binary split for this tile set. The semantics of log2_diff_ctu_max_bt_size apply but for the tile set.

tileset_sbtmvp_size_override_flag_present_flag equal to 1 specifies that tileset_sbtmvp_size_override_flag and if tileset_sbtmvp_size_override_flag is equal to 1 then log2_tileset_sbtmvp_active_size_minus2 are present. tileset_sbtmvp_size_override_flag_present_flag equal to 0 specifies that tileset_sbtmvp_size_override_flag and log2_tileset_sbtmvp_active_size_minus2 are not present. When not present tileset_sbtmvp_size_override_flag_present_flag and log2_tileset_sbtmvp_active_size_minus2 are respectively inferred to be equal to sbtmvp_size_override_flag and log2_sbtmvp_active_size_minus2 from the pic_header( ) structure corresponding to the ts_pic_header_id in this tilset_header( ) active for this tile set.

tilset_sbtmvp_size_override_flag equal to 1 specifies that the syntax element log2_tilset_sbtmvp_active_size_minus2 is present for the current tile set. sbtmvp_size_override_flag equal to 0 specifies that the syntax element log2_tilset_sbtmvp_active_size_minus2 is not present and log2_tileset_sbtmvp_size_active_minus2 is inferred to be equal to log2_sbtmvp_size_active_minus2.

log2_tilset_sbtmvp_active_size_minus2 plus 2 specifies the value of the subblock size that is used for deriving the motion parameters for the subblock-based TMVP of the current tile set. When log2_tilset_sbtmvp_size_active_minus2 is is not present, it is inferred to be equal to log2_sbtmvp_size_active_minus2. The variable is derived as follows:

Log2SbtmvpSize=log2_tileset_sbtmvp_size_active_minus2+2 tileset_tmvp_info_present_flag equal to 1 specifies that tileset_temporal_mvp_enabled_flag, tileset_mvd_l1_zero_flag, and tileset_collocated_from_l0_flag may be present. tileset_tmvp_info_present_flag equal to 0 specifies that tileset_temporal_mvp_enabled_flag, tileset_mvd_l1_zero_flag, and tileset_collocated_from_l0_flag are not present. When not present tileset_temporal_mvp_enabled_flag, tileset_mvd_l1_zero_flag, and tileset_collocated_from_l0_flag are respectively inferred to be equal to pic_temporal_mvp_enabled_flag, mvd_l1_zero_flag, and collocated_from_l0_flag from the pic_header( ) structure corresponding to the ts_pic_header_id in this tilset_header( ) active for this tile set.

tileset_temporal_mvp_enabled_flag specifies whether temporal motion vector predictors can be used for inter prediction for the current tile set. If tileset_temporal_mvp_enabled_flag is equal to 0, the syntax elements of the current tile set shall be constrained such that no temporal motion vector predictor is used in decoding of the current tile set. Otherwise (tileset_temporal_mvp_enabled_flag is equal to 1), temporal motion vector predictors may be used in decoding of the current tile set. When not present, the value of tileset_temporal_mvp_enabled_flag is inferred to be equal to pic_temporal_mvp_enabled_flag from the pic_header( ) structure corresponding to the ts_pic_header_id in this tilset_header( ) active for this tile set.

tilset_mvd_l1_zero_flag equal to 1 indicates that the mvd_coding(x0, y0, 1) syntax structure is not parsed and MvdL1[x0] [y0][compIdx] is set equal to 0 for compIdx=0..1 for the current tile set. mvd_l1_zero_flag equal to 0 indicates that the mvd_coding(x0, y0, 1) syntax structure is parsed for the current tile set.

tilset_collocated_from_l0_flag equal to 1 specifies that for the current tile set the collocated picture used for temporal motion vector prediction is derived from reference picture list 0. collocated_from_l0_flag equal to 0 specifies that for the current tile set the collocated picture used for temporal motion vector prediction is derived from reference picture list 1. When tilset_collocated_from_l0_flag is not present, it is inferred to be equal to collocated_from_l0 flag from the pic_header( ) structure corresponding to the ts_pic_header_id in this tilset_header( ) active for this tile set.

tilset_six_minus_max_num_merge_cand_present_flag equal to 1 specifies that tilset_six_minus_max_num_merge_cand is present. tilset_six_minus_max_num_merge_cand_present_flag equal to 0 specifies that tilset_six_minus_max_num_merge_cand is not present. When not present tileset_six_minus_max_num_merge_cand is inferred to be equal to six_minus_max_num_merge_cand from the pic_header( ) structure corresponding to the ts_pic_header_id in this tilset_header( ) active for this tile set.

tilset_six_minus_max_num_merge_cand specifies the maximum number of merging motion vector prediction (MVP) candidates supported in the current tile set subtracted from 6. The maximum number of merging MVP candidates, MaxNumMergeCand is derived as follows:

MaxNumMergeCand=6−tilset_six_minus_max_num_merge_cand

The value of MaxNumMergeCand shall be in the range of 1 to 6, inclusive.

tilset_dep_quant_info_present_flag equal to 1 specifies that tilset_dep_quant_enabled_flag is present. tilset_dep_quant_info_present_flag equal to 0 specifies that tileset_dep_quant_enabled_flag is not present. When not present tileset_dep_quant_enabled_flag is inferred to be equal to dep_quant_enabled_flag from the pic_header( ) structure corresponding to the ts_pic_header_id in this tilset_header( ) active for this tile set.

tileset_dep_quant_enabled_flag equal to 0 specifies that dependent quantization is disabled for the current tile set. tileset_dep_quant_enabled_flag equal to 1 specifies that dependent quantization is enabled for the current tile set.

tileset_sign_data_hiding_enabled_flag equal to 0 specifies that sign bit hiding is disabled for the current tile set. tile_sign_data_hiding_enabled_flag equal to 1 specifies that sign bit hiding is enabled for the current tile set. When tile_sign_data_hiding_enabled_flag is not present, it is inferred to be equal to sign_data_hiding_enabled_flag from the pic_header( ) structure corresponding to the ts_pic_header_id in this tilset_header( ) active for this tile set.

Table 24 illustrates an example of tileset_data( ) syntax which may be signaled by data encapsulator 107 according to the techniques herein.

TABLE 24

| | Descriptor |
|---|---|
| tileset_data( ) | |
|   do { | |

TABLE 24-continued

| | Descriptor |
|---|---|
|     coding_tree_unit( ) | |
|     end_of_tileset_flag | ae(v) |
|     CtbAddrInRs++ | |
|   } while( !end_of_tileset_flag ) | |
| } | |

With respect to Table 24, the respective syntax elements may be based on the following definitions:

end_of_tileset_flag equal to 0 specifies that another CTU is following in the tile set. end_of_tileset_flag equal to 1 specifies the end of the tile set slice, i.e., that no further CTU follows in the tile set.

Table 25 illustrates an example of rbsp_tileset_trailing_bits( ) syntax which may be signaled by data encapsulator 107 according to the techniques herein.

TABLE 25

| | Descriptor |
|---|---|
| rbsp_tileset_trailing_bits( ) { | |
|   rbsp_trailing_bits( ) | |
|   while( more_rbsp_trailing_data( ) ) | |
|     cabac_zero_word /* equal to 0x0000 */ | f(16) |
| } | |

Table 26 illustrates an example of pic_header_rbsp( ) syntax which may be signaled by data encapsulator 107 according to the techniques herein.

TABLE 26

| | Descriptor |
|---|---|
| pic_header_rbsp( ) { | |
|   pic_header( ) | |
|   rbsp_pic_header_trailing_bits( ) | |
| } | |

Table 27 illustrates an example of pic_header( ) syntax which may be signaled by data encapsulator 107 according to the techniques herein.

TABLE 27

| | Descriptor |
|---|---|
| pic_header( ) { | |
|   pic_parameter_set_id | ue(v) |
|   pic_header_id | ue(v) |
|   picture_type | ue(v) |
|   if ( picture_type!= I ) { | |
|     log2_diff_ctu_max_bt_size | ue(v) |
|     if( sps_sbtmvp_enabled_flag ) { | |
|       sbtmvp_size_override_flag | u(1) |
|       if( sbtmvp_size_override_flag ) | |
|         log2_sbtmvp_active_size_minus2 | u(3) |
|     } | |
|     if( sps_temporal_mvp_enabled_flag ) | |
|       pic_temporal_mvp_enabled_flag | u(1) |
|     if(picture_type == B ) | |
|       mvd_l1_zero_flag | u(1) |
|     if(pic_temporal_mvp_enabled_flag ) { | |
|       if( picture_type == B ) | |
|         collocated_from_l0_flag | u(1) |
|     } | |
|     six_minus_max_num_merge_cand | ue(v) |
|   } | |
|   dep_quant_enabled_flag | u(1) |
|   if( !dep_quant_enabled_flag ) | |

TABLE 27-continued

| | Descriptor |
|---|---|
|     sign_data_hiding_enabled_flag<br>    byte_alignment( )<br>} | u(1) |

With respect to Table 24, the respective syntax elements may be based on the following definitions:
pps_pic_parameter_set_id identifies the PPS for reference by other syntax elements. The value of pps_picparameter_set_id shall be in the range of 0 to 63, inclusive. pic_header_id identifies the picture header for reference by other syntax elements. The value of pps_pic_parameter_set_id shall be in the range of 0 to $2^{32}-1$, inclusive.
picture_type indicates the coding type of the picture according to Table 28 The value of pic_type shall be equal to 0, 1 or 2 in bitstreams conforming to this version of this Specification. Other values of pic_type are reserved for future use. Decoders conforming to this version of this Specification shall ignore reserved values of pic_type.

TABLE 28

| picture_<br>type | Name of the picture_type may be present in the coded picture |
|---|---|
| 0 | B (B picture) |
| 1 | P (P picture) |
| 2 | I (I picture) | log2_diff_ctu_max_bt_size specifies the difference between the luma CTB size and the maximum luma size (width or height) of a coding block that can be split using a binary split.
sbtmvp_size_override_flag equal to 1 specifies that the syntax element log2_sbtmvp_active_size_minus2 is present for the current slice. sbtmvp_size_override_flag equal to 0 specifies that the syntax element log2_atmvp_active_size_minus2 is not present and log2_sbtmvp_size_active_minus2 is inferred to be equal to log2_sbtmvp_default_size_minus2.
log2_sbtmvp_active_size_minus2 plus 2 specifies the value of the subblock size that is used for deriving the motion parameters for the subblock-based TMVP of the current slice. When log2_sbtmvp_size_active_minus2 is is not present, it is inferred to be equal to log2_sbtmvp_default_size_minus2. The variable is derived as follows:

Log2SbtmvpSize=log2_sbtmvp_size_active_minus2+2 pic_temporal_mvp_enabled_flag specifies whether temporal motion vector predictors can be used for inter prediction for the current picture. If pic_temporal_mvp_enabled_flag is equal to 0, the syntax elements of the current picture shall be constrained such that no temporal motion vector predictor is used in decoding of the current picture. Otherwise (pic_temporal_mvp_enabled_flag is equal to 1), temporal motion vector predictors may be used in decoding of the current picture. When not present, the value of pic_temporal_mvp_enabled_flag is inferred to be equal to 0.
mvd_l1_zero_ flag equal to 1 indicates that the mvd_coding (x0, y0, 1) syntax structure is not parsed and MvdL1[x0][y0] [compIdx] is set equal to 0 for compIdx=0 . . . 1.
mvd_l1_zero_flag equal to 0 indicates that the mvd_coding (x0, y0, 1) syntax structure is parsed.
collocated_from_l0_flag equal to 1 specifies that the collocated picture used for temporal motion vector prediction is derived from reference picture list 0. collocated_from_l0_flag equal to 0 specifies that the collocated picture used for temporal motion vector prediction is derived from reference picture list 1. When collocated_from_l0_flag is not present, it is inferred to be equal to 1.
six_minus_max_num_merge_cand specifies the maximum number of merging motion vector prediction (MVP) candidates supported in the slice subtracted from 6. The maximum number of merging MVP candidates, MaxNumMergeCand is derived as follows:

MaxNumMergeCand=6−six_minus_max_num_merge_cand

The value of MaxNumMergeCand shall be in the range of 1 to 6, inclusive.
dep_quant_enabled_flag equal to 0 specifies that dependent quantization is disabled. dep_quant_enabled_flag equal to 1 specifies that dependent quantization is enabled.
sign_data_hiding_enabled_flag equal to 0 specifies that sign bit hiding is disabled. sign_data_hiding_enabled_flag equal to 1 specifies that sign bit hiding is enabled. When sign_data_hiding_enabled_flag is not present, it is inferred to be equal to 0.
It should be noted that in one example, one or more syntax elements in pic_header( ) may be signaled in PPS_NUT instead of the PICH_NUT.
Table 29 illustrates an example of rbsp_pic_header_trailing_bits( ) syntax which may be signaled by data encapsulator 107 according to the techniques herein.

TABLE 29

| | Descriptor |
|---|---|
| rbsp_pic_header_trailing_bits( ) {<br>  rbsp_trailing_bits( )<br>  while( more_rbsp_trailing_data( ) )<br>    cabac_zero_word /* equal to 0x0000 */<br>} | <br><br><br>f(16) |

It should be noted that in some examples, a picture header can apply to one or more pictures. Further, in some examples, parameters in a picture header can be overridden for a tile set according to by tile set parameters. In some example cases, certain restrictions may apply for overriding parameters in a picture header for a tile set.
As described above, in ITU-T H.265, some or all of tile structure, i.e. one or more tile and/or tile set related parameters for a picture is signaled using a Picture Parameter Set. In one example, according to the techniques herein a tile structure may be signaled in the Picture Parameter Set, where, as provided above, a picture parameter set is identified in a picture_header( ) In another example some or all of tile structure, i.e. one or more tile and/or tile set related parameters may be signaled in Sequence Parameter Set (SPS).
In this manner, source device 102 represents an example of a device configured to signal a value for a syntax element in a network abstraction layer unit indicating a tile set layer syntax structure is included in the network abstraction layer unit and signal values for one or more tile set parameters included in the tile set layer syntax structure.
Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, $I^2C$, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Data decapsulator 123 may be configured to receive and parse any of the example syntax structures described herein.

Video decoder 124 may include any device configured to receive a bitstream (e.g., a MCTS sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light-emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
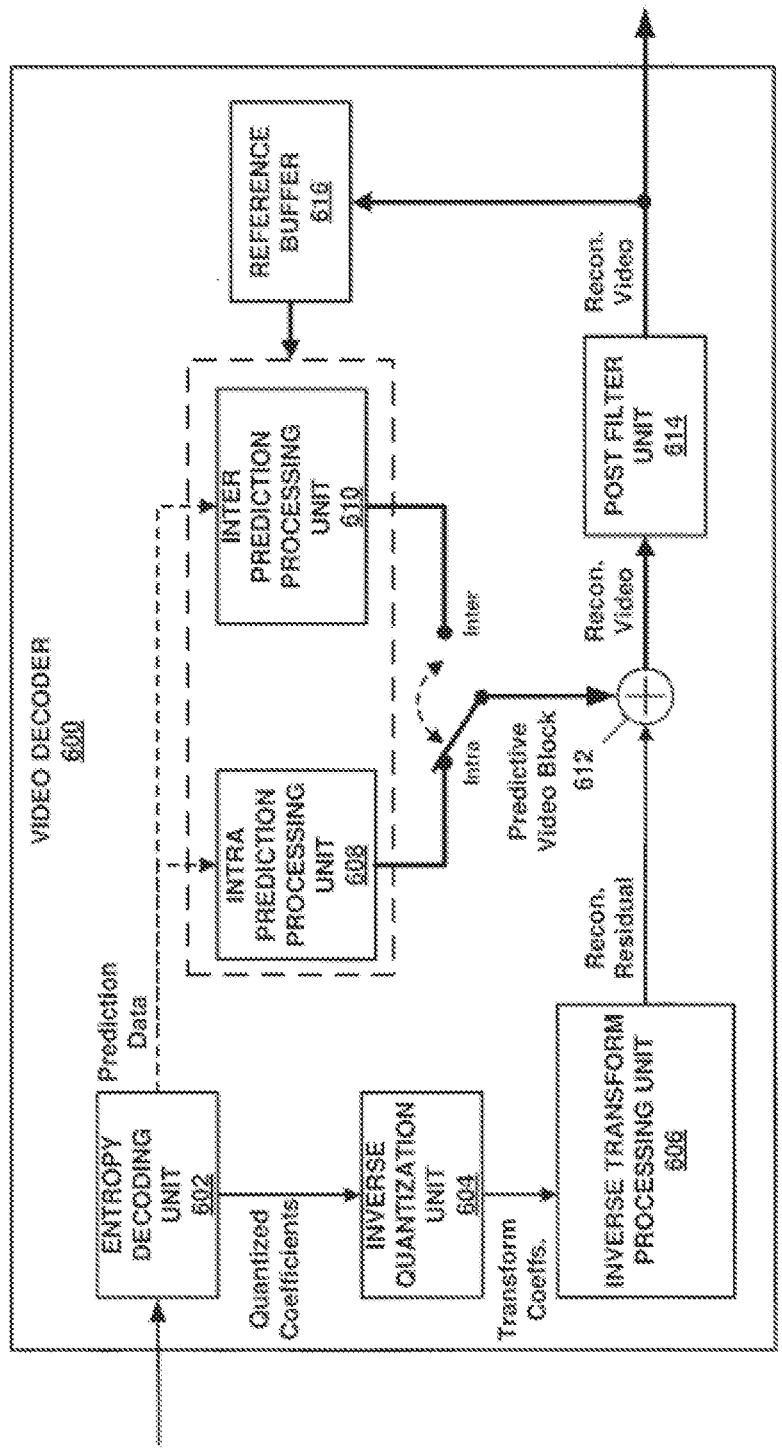
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure. In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-27. Video decoder 600 may perform video decoding based on the values of parsed syntax elements. For example, different video decoding techniques may be performed based on whether a picture is of a particular type.

In the example illustrated in FIG. 6, video decoder 600 includes an entropy decoding unit 602, an inverse quantization unit 604, an inverse transform processing unit 606, an intra prediction processing unit 608, an inter prediction processing unit 610, a summer 612, a post filter unit 614, and a reference buffer 616. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, the entropy decoding unit 602 receives an entropy encoded bitstream. The entropy decoding unit 602 may be configured to decode syntax elements and quantized coefficients from the bitstream according to a process reciprocal to an entropy encoding process. The entropy decoding unit 602 may be configured to perform entropy decoding according any of the entropy coding techniques described above. The entropy decoding unit 602 may determine values for syntax elements in an encoded bitstream in a manner consistent with a video coding standard. As illustrated in FIG. 6, the entropy decoding unit 602 may determine a quantization parameter, quantized coefficient values, transform data, and predication data from a bitstream. In the example, illustrated in FIG. 6, the inverse quantization unit 604 and the inverse transform processing unit 606 receives a quantization parameter, quantized coefficient values, transform data, and predication data from the entropy decoding unit 602 and outputs reconstructed residual data.

Referring again to FIG. 6, reconstructed residual data may be provided to the summer 612. The summer 612 may add reconstructed residual data to a predictive video block and generate reconstructed video data. A predictive video block may be determined according to a predictive video technique (i.e., intra prediction and inter frame prediction). The intra prediction processing unit 608 may be configured to receive intra prediction syntax elements and retrieve a predictive video block from the reference buffer 616. The reference buffer 616 may include a memory device configured to store one or more frames of video data. Intra prediction syntax elements may identify an intra prediction mode, such as the intra prediction modes described above. The inter prediction processing unit 610 may receive inter prediction syntax elements and generate motion vectors to identify a prediction block in one or more reference frames stored in the reference buffer 616. The inter prediction processing unit 610 may produce motion compensated blocks, possibly performing interpolation based on interpolation filters. Identifiers for interpolation filters to be used for motion estimation with sub-pixel precision may be included in the syntax elements. The inter prediction processing unit 610 may use interpolation filters to calculate interpolated values for sub-integer pixels of a reference block. The post filter unit 614 may be configured to perform filtering on reconstructed video data. For example, the post filter unit 614 may be configured to perform deblocking and/or Sample Adaptive Offset (SAO) filtering, e.g., based on parameters specified in a bitstream. Further, it should be noted that in some examples, the post filter unit 614 may be configured to perform proprietary discretionary filtering (e.g., visual enhancements, such as, mosquito noise reduction). As illustrated in FIG. 6, a reconstructed video block may be output by the video decoder 600. In this manner, the video decoder 600 represents an example of a device configured to parse a value for a syntax element in a network abstraction layer unit indicating a tile set layer syntax structure is included in the network abstraction layer unit, parse values for one or more tile set parameters included in the tile set layer syntax structure, and generate video data based on the parsed values for one or more tile set parameters.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application-specific or general application integrated circuit (ASIC), a field-programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller; a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

What is claimed is:

1. A method of encoding video data, the method comprising:
   signaling, into a bitstream, a plurality of picture parameters included in a picture header of a picture in the video data;
   signaling, into the bitstream, a present flag included in a sub-picture header of a sub-picture generated by dividing the picture;
   determining, based on the present flag, whether a specific one of a plurality of sub-picture parameters is determined based on the sub-picture header or the picture header, the specific one of the plurality of sub-picture parameters corresponding to a specific one of the plurality of picture parameters; and
   reconstructing the sub-picture based on the specific one of the plurality of sub-picture parameters when the specific one of the plurality of sub-picture parameters is determined based on the sub-picture header.

2. The method according to claim 1, further comprising:
   reconstructing the sub-picture based on the specific one of the plurality of picture parameters without signaling the specific one of the plurality of sub-picture parameters into the sub-picture header of the bitstream when the specific one of the plurality of sub-picture parameters is determined based on the picture header.

3. The method according to claim 1, wherein the present flag indicates whether the specific one of the plurality of sub-picture parameters is included in the sub-picture header for overriding the specific one of the plurality of picture parameters.

4. The method according to claim 1, wherein:
   the sub-picture is a tile set including one or more tiles divided from the picture, and
   the sub-picture header is a tile set header.

5. The method according to claim 1, wherein:
   the sub-picture is a slice divided from the picture, and
   the sub-picture header is a slice header.

6. The method according to claim 1, wherein the picture header is a non-video coding Layer VCL (non-VCL) network abstraction layer (NAL) unit in the bitstream.

7. The method according to claim 6, wherein:
the plurality of picture parameters in the picture header includes at least one of a temporal motion vector prediction (MVP) enabled flag, a collected picture flag, and a motion vector difference (MVD) flag,
the temporal MVP enabled flag indicates whether a temporal motion vector predictor is enabled for the picture,
the collocated picture flag indicates whether a collocated picture used for a temporal MVP is derived from a reference picture list having a list number equal to zero, and
the MVD flag indicates whether an MVD coding syntax structure is not parsed.

8. The method according to claim 7, wherein:
the temporal MVP enabled flag is a flag pic_temporal_mvp_enabled_flag,
the collected picture flag is a flag collocated_from_l0_flag, and
the MVD flag is a flag mvd_l1_zero_flag.

9. The method according to claim 1, further comprising:
signaling the specific one of the plurality of sub-picture parameters into the sub-picture header of the bitstream when the present flag is equal to one; and
determining the specific one of the plurality of sub-picture parameters being equal to the specific one of the plurality of picture parameters without signaling the specific one of the plurality of sub-picture parameters into the sub-picture header of the bitstream when the present flag is equal to zero.

10. A non-transitory machine-readable medium of an electronic device storing a plurality of computer-executable instructions for encoding vidoe data, the plurality of computer-executable instructions when executed by a processing unit of the electronic device, causing the electronic device to:
signal, into a bitstream, a plurality of picture parameters included in a picture header of a picture in the video data;
signal, into the bitstream, a present flag included in a sub-picture header of a sub-picture generated by dividing the picture;
determine, based on the present flag, whether a specific one of a plurality of sub-picture parameters is determined based on the sub-picture header or the picture header, the specific one of the plurality of sub-picture parameters corresponding to a specific one of the plurality of picture parameters; and
reconstruct the sub-picture based on the specific one of the plurality of sub-picture parameters when the specific one of the plurality of sub-picture parameters is determined based on the sub-picture header.

11. The non-transitory machine-readable medium according to claim 10, wherein the plurality of computer-executable instructions, when executed by the processing unit, further causes the electronic device to:
reconstruct the sub-picture based on the specific one of the plurality of picture parameters without signaling the specific one of the plurality of sub-picture parameters into the sub-picture header of the bitstream when the specific one of the plurality of sub-picture parameters is determined based on the picture header.

12. The non-transitory machine-readable medium according to claim 10, wherein the present flag indicates whether the specific one of the plurality of sub-picture parameters is included in the sub-picture header for overriding the specific one of the plurality of picture parameters.

13. The non-transitory machine-readable medium according to claim 10, wherein:
the sub-picture is a tile set including one or more tiles divided from the picture, and
the sub-picture header is a tile set header.

14. The non-transitory machine-readable medium according to claim 10, wherein:
the sub-picture is a slice divided from the picture, and
the sub-picture header is a slice header.

15. The non-transitory machine-readable medium according to claim 10, wherein the picture header is a non-video coding Layer VCL (non-VCL) network abstraction layer (NAL) unit in the bitstream.

16. The non-transitory machine-readable medium according to claim 15, wherein:
the plurality of picture parameters in the picture header includes at least one of a temporal motion vector prediction (MVP) enabled flag, a collected picture flag, and a motion vector difference (MVD) flag,
the temporal MVP enabled flag indicates whether a temporal motion vector predictor is enabled for the picture,
the collocated picture flag indicates whether a collocated picture used for a temporal MVP is derived from a reference picture list having a list number equal to zero, and
the MVD flag indicates whether an MVD coding syntax structure is not parsed.

17. The machine-readable medium according to claim 16, wherein:
the temporal MVP enabled flag is a flag pic_temporal_mvp_enabled_flag, and
the collected picture flag is a flag collocated_from_l0_flag and the MVD flag is a flag mvd_l1_zero_flag.

18. The machine-readable medium according to claim 10, wherein the plurality of computer-executable instructions, when executed by the processing unit, further causes the electronic device to:
signal the specific one of the plurality of sub-picture parameters into the sub-picture header of the bitstream when the present flag is equal to one; and
determine the specific one of the plurality of sub-picture parameters being equal to the specific one of the plurality of picture parameters without signaling the specific one of the plurality of sub-picture parameters into the sub-picture header of the bitstream when the present flag is equal to zero.

* * * * *